US00RE33910E

United States Patent [19]

Compton

[11] E Patent Number: Re. 33,910

[45] Reissued Date of Patent: May 5, 1992

[54] CNC TURNING MACHINE

[75] Inventor: Ronald E. Compton, Southfield, Mich.

[73] Assignee: The Cross Company, Fraser, Mich.

[21] Appl. No.: 645,346

[22] Filed: Jan. 23, 1991

Related U.S. Patent Documents

Reissue of:

[64] Patent No.: 4,653,360
Issued: Mar. 31, 1987
Appl. No.: 731,419
Filed: May 7, 1985

U.S. Applications:

[63] Continuation of Ser. No. 329,885, Mar. 28, 1989, abandoned.

[51] Int. Cl.[5] ..... B23B 5/24

[52] U.S. Cl. ..... 82/18; 82/118; 82/137; 318/135; 318/571; 318/687; 364/474.02; 364/474.15; 364/474.25; 364/474.29

[58] Field of Search ..... 82/18, 118, 137, 149, 82/147; 318/39, 135, 561, 567, 570, 571, 572, 573, 574, 687; 364/164, 165, 474.02, 474.15, 474.25, 474.29

[56] References Cited

U.S. PATENT DOCUMENTS

| | | | |
|---|---|---|---|
| 3,168,846 | 2/1965 | Binns | 82/24 R |
| 3,414,787 | 12/1968 | Reuteler et al. | 318/570 |
| 3,551,656 | 12/1970 | Wohlfeil | 318/18 |
| 3,555,252 | 1/1971 | Garden | 318/18 |
| 3,686,547 | 8/1972 | Kelling | 318/594 |
| 3,753,384 | 8/1973 | Anfindsen | 82/137 |
| 3,904,900 | 9/1975 | Schichida et al. | 318/38 |
| 4,005,552 | 2/1977 | Hoglund et al. | 51/101 R |
| 4,027,245 | 5/1977 | Bourrat et al. | 235/151.11 |
| 4,131,837 | 12/1978 | Whetham | 318/571 |
| 4,203,062 | 5/1980 | Bathen | 82/137 |
| 4,220,899 | 9/1980 | von der Heide | 318/135 |
| 4,334,180 | 6/1982 | Bramm et al. | 318/687 |
| 4,447,770 | 5/1984 | Shepherd | 318/657 |
| 4,501,093 | 2/1985 | Fisher | 51/165.71 |
| 4,628,499 | 12/1986 | Hammett | 318/657 |
| 4,646,596 | 3/1987 | Edwards et al. | 82/19 |
| 4,672,550 | 6/1987 | Winterbottom et al. | 364/474 |

FOREIGN PATENT DOCUMENTS

| | | | |
|---|---|---|---|
| 3013410 | 10/1981 | Fed. Rep. of Germany | 82/149 |
| 104223 | 5/1974 | German Democratic Rep. | |

OTHER PUBLICATIONS

Kuo, Benjamin C., "Automatic Control Systems" Third Edition Prentice-Hall Inc., 1975, pp. 295-305.

*Primary Examiner*—William E. Terrell

*Attorney, Agent, or Firm*—D. Syrowik; R. J. Eifler

[57] ABSTRACT

A turning machine is characterized by a new and improved control and mechanism for positioning the turning tool on the head. A CNC control issues command signals for selectively positioning the tool on the head. These signals are developed from an encoder which provides the instantaneous position of the rotating part being turned and from a program in the CNC containing information about the part. A closed loop control system receives these command signals and converts same into a control current for a linear motor which is the prime mover controlling the positioning of the tool on the head. The linear motor operates a carriage on the head and the cutting tool mounts on the carriage opposite the connection of the linear motor to the carriage. The carriage is a hollow bar guided on the head by sets of rollers which are cooperatively arranged to provide yieldably forceful constraint of the bar. The rolling action of the bar on the head provides a low friction, low inertia construction enabling rapid response to CNC commands. The head also contains various sensors providing position and velocity feedback information for use by the closed loop control. The closed loop control contains various circuit components organized and arranged to provide fast and faithful response to command signals. The machine has the ability to accurately turn complex parts where position information is being rapidly updated, often in the tens of kilohertz frequency range. Different parts can be turned by merely changing the CNC program.

* * * * *

The questions raised in reexamination request No. 90/001,657, filed Dec. 1, 1988, have been considered and the results thereof are reflected in this reissue patent which constitutes the reexamination certificate required by 35 U.S.C. 307 as provided in 37 CFR 1.570(e).

45 Claims, 9 Drawing Sheets

PART SURFACE DEFINITION $= f(\theta, z)$ FOR $\theta = 0$ to $n$, $z = 0$ to $m$ $$\begin{vmatrix} r_{0,0} & r_{1,0} & \cdots & r_{n,0} \\ r_{0,1} & r_{1,1} & \cdots & r_{n,1} \\ \vdots & \vdots & & \vdots \\ r_{0,m} & r_{1,m} & \cdots & r_{n,m} \end{vmatrix}$$

TOOL POSITION PROFILE $= g\left[f(\theta, z),\ dz/dt,\ d\theta/dt\right]$

40

CNC TURNING MACHINE

Matter enclosed in heavy brackets [ ] appears in the original patent but forms no part of this reissue specification; matter printed in italics indicates the additions made by reissue.

*This is a continuation of co-pending application Ser. No. 07/329,885 filed on Mar. 28, 1989, abandoned.*

BACKGROUND AND SUMMARY OF THE INVENTION

This invention relates generally to turning machines and specifically to a new and unique CNC turning machine which is adapted for complex turning of parts such as pistons.

An example of a known turning machine is illustrated in U.S. Pat. No. 3,869,947, commonly assigned. In the turning machine disclosed in thar patent, a part to be turned, for example a piston, is suitably chucked and rotated about its axis at an appropriate speed. A cutting tool is arranged to make a pass along the rotating part and machine the outer part surface, i.e. the piston skirt. As the cutting tool is making its axial pass along the part, the cutting tool's radial position is continuously correlated with the rotation of the part to produce a desired shape. This correlation is achieved by a cam and follower system. Such a system is capable of imparting both eccentricity and taper to the part, i.e. complex turning. In other words in the case of a piston, the system is capable of producing either straight or tapered skirts of either circular or elliptical cross section, depending upon the desired shape.

Such a turning machine is well suited for making large numbers of identical parts. However if different shaped parts are to be turned, the machine must be shut down for change-over. When such shut-down occurs, the machine is removed from productive use, and where precision parts are involved, as is usually the case, care must be taken to ensure that the new cam and the follower produce the desired precision. The amount of set-up time for the new cam also adds to the total machine downtime.

Turning operations of the type conducted on piston skirts typically involve relatively high rotational speeds for the pistons. In the cam and follower type system described above, the dynamics of the machine and mechanism can limit the ability of the follower to track the cam. Hence minor changes in the cam surface shape may be difficult to follow, and there is necessarily a limit to the ultimate precision with which parts can be machined by such an apparatus for a given production rate.

Another prior art approach to controlling the radial position of the tool head in a piston turning operation is disclosed in U.S. Pat. No. 4,203,062, issued May 13, 1980 to Bathen for "Machine Tool Control Systems." The Bathen system employs [computer] numerical control with a feedback loop which compares a position signal representing the present position of the tool to a programmed position signal to produce an error signal which controls energization of a linear motor driving the tool.

The present invention is directed to a new and improved turning machine which possesses a number of important advantages over prior machines.

One important advantage is that the present invention eliminates the mechanical cam and follower type system by using numerical input data to define the part shape. This data is acted upon by a CNC system which generates appropriate commands to control the cutting tool position at all times during turning. Hence a turning machine embodying principles of the invention is not limited by the mechanical dynamics of the prior cam and follower systems which established an ultimate limit to the machine's capabilities.

Because the control data is embodied in electronic form in the practice of the present invention rather than as a mechanical model like a cam, there is no elaborate mechanical change-over required when part shape is to be changed. Rather the CNC is provided with a new part program for the new part, and it automatically acts upon the new part program data to issue appropriate commands for control of the cutting tool.

Moreover, with the elimination of the mechanical cam and follower, the present invention affords the opportunity for attaining even higher degrees of precision in the high speed turning of parts.

Not only is the versatility of a turning machine significantly enhanced since it can handle many different part sizes, but with improved efficiency and precision potentials, the opportunity for significant productivity gains is also presented by the present invention.

The general idea of applying a CNC system to a cutting tool is of course known. For example CNC lathes are representative commercial products. However in the context of a high speed turning apparatus such as a piston turning machine, the application of CNC technology has heretofore been deemed impractical because of inherent mechanical limitations in mechanism for positioning the cutting tool.

Consider a situation where a part is to be turned at say several thousand RPM and is to be provided with an elliptical cross sectional shape. The cutting tool must make two reciprocations radially of the part for each complete revolution of the part. In the case of a piston rotating at 2400 RPM, this means that the cutting tool is required to execute precisely controlled linear oscillations at a frequency of 80 hertz. For example if it is assumed that the acceleration of the tool is required to follow a 0.007 inch radial displacement at this speed, the acceleration amounts to 37 feet per second per second. In order to achieve this magnitude of response, the mass associated with the oscillating cutting tool must be small. Yet at the same time that the mass, including the cutting tool, is executing this oscillatory motion, they are being subjected to a load imposed by the interaction of the cutting tool with the rotating part. The requirements of minimizing the mass associated with the cutting tool in order to attain a satisfactory response at the expected oscillatory frequencies and of accurately linearly guiding same with minimum static and dynamic friction, are seemingly inconsistent with requirements that the cutting tool and its associated mass be sturdily constructed and supported to react the loads imposed on them without undesired effects such as tool chatter and/or deflection so that the desired contour of the part can be achieved. Moreover, since many parts are of complex contour including an axial taper, such taper usually has to be taken into account as well.

Accordingly, another aspect of the present invention involves a new and unique construction for the mechanical mechanism which oscillates the cutting tool. Among the new and unique features are the prime mover which is utilized to impart oscillatory motion to the cutting tool, the construction of the cutting tool carriage, and the arrangement for guiding the carriage on a head.

In the preferred embodiment of the invention the prime mover comprises a linear motion, sometimes referred to as a voice coil motor. This prime mover has a low inertia armature for fast response, yet it is capable of precise movement while exerting ample force to counter cutting loads imposed when the cutting tool interacts with a part being turned. The cutting tool carriage is operated by the motor armature. A sturdy, yet low friction, mounting of the carriage on the head also assists in reacting the cutting loads while enabling the desired oscillatory action to be obtained so that accurate parts are consistently produced.

Another aspect of the invention involves the cooperative relationship between the CNC system and certain mechanical mechanisms of the machine. A portion of the CNC operation is devoted to a closed loop control with the part being turned whereby the relative axial position of the part to the cutting tool and the rotational position of the part about the axis of its rotation are precisely controlled and known at all times. The CNC acts upon the part program in conjunction with the aforementioned closed loop control to issue correlated commands for use in controlling the voice coil motor, and hence the radial oscillation of the cutting tool. These commands are transmitted by via a high speed data link to a position profile computer which translates the commands into an appropriate form for causing the voice coil motor to produce the double oscillation of the cutting tool per each revolution of the part when an elliptical contour is being machined.

The position profile computer is a system dedicated to the radial positioning of the cutting tool, and it forms a portion of a closed loop control for the cutting tool position. Associated with the voice coil motor and carriage, are various sensors which provide feedback signals to this latter closed loop control. These are all operatively related such that digital data from the CNC and feedback signals from the various sensors are appropriately processed to produce a control current for the voice coil motor which produces the desired oscillation of the cutting tool.

Accordingly the dedicated system comprises digital circuit components performing digital calculations. It also has digital-to-analog devices organized and arranged to act upon certain digital commands to produce an appropriate analog control current for the voice coil motor. As will be seen [leter] *later*, there are particular relationships involved in this closed loop control which are advantageous in causing the tool to faithfully follow the CNC digital commands.

The foregoing features, advantages, and benefits of the invention, along with additional ones, will be seen in the ensuing description and claims which should be considered in conjunction with the accompanying drawings. The drawings disclose an exemplary, presently preferred embodiment of the invention according to the best mode contemplated at the present time in carrying out the invention.

DESCRIPTION OF THE PREFERRED EMBODIMENT

The reader's comprehension of principles of the present invention which will be explained can perhaps be expedited by considering first a description of certain relationships which are disclosed with reference to FIGS. 1 through 5.

Figure 1:
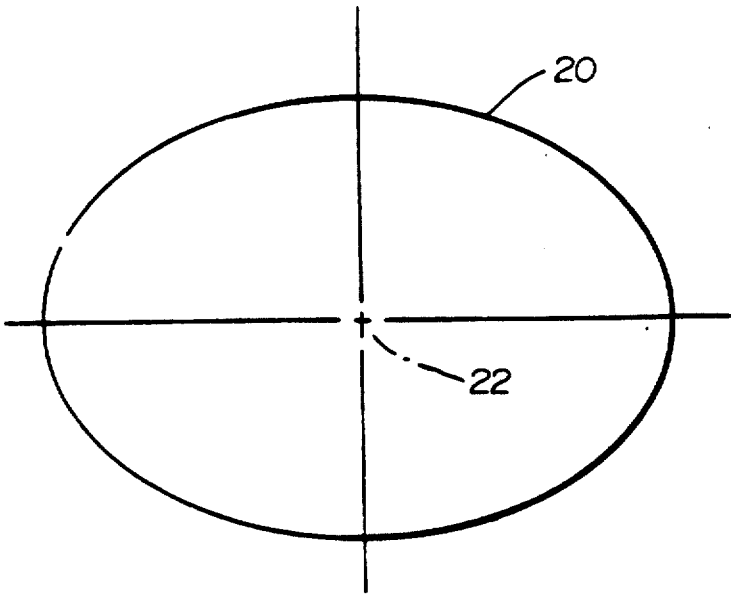
FIGS. 1 and 2 are diagrammatic views, an end view and a longitudinal view respectively, of a complex surface useful for purposes of explaining principles of the present invention.
Figure 2:
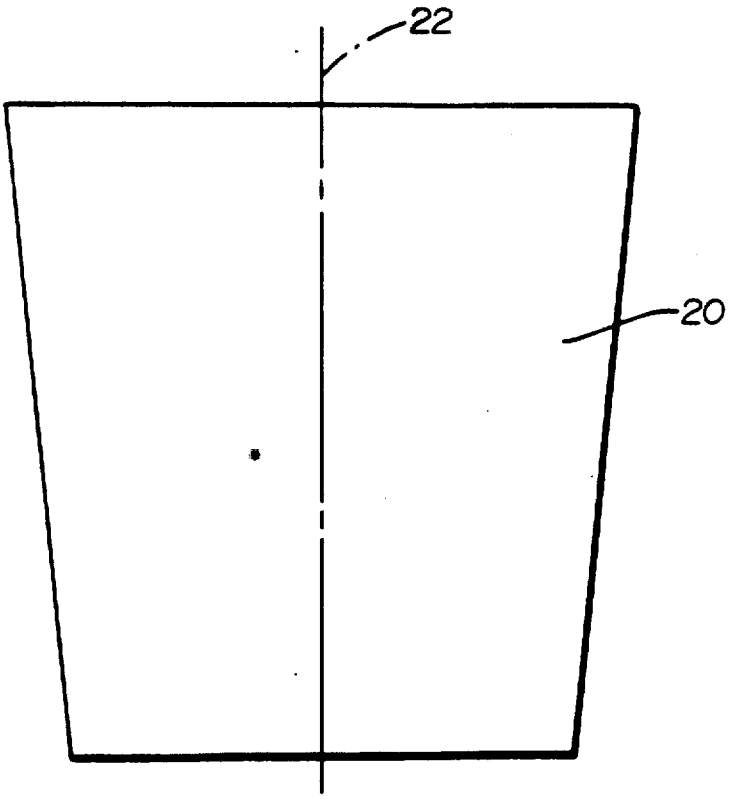

FIGS. 1 and 2 are diagrammatic views which illustrate a complex surface 20 which is typical of a piston skirt. It is to be appreciated that FIGS. 1 and 2 are diagrammatic in nature and therefore exaggerated in proportion to what would typically be the proportions in an actual piston.

Surface 20 may be considered to comprise a longitudinal axis 22. While it also may be considered as having a generally frusto-conically tapered shape, the actual cross section through the surface is elliptical, as can be seen from consideration of FIG. 1 which is representative of both an end view and a typical cross section.

Surface 20 may be mathematicaly defined in any of a number of possible ways. Because the disclosed preferred embodiment of the present invention utilizes a CNC, surface 20 is defined as a set of discrete points in space. These points are most conveniently identified in terms of a three dimensional coordinate system wherein one coordinate represents the angular location about axis 22 as referenced from a radial datum another coordinate represents longitudinal (i.e. axial) location along the length of axis 22 as referenced from a longitudinal datum, and the third represents the length of a radial to axis 22. For convenience, the angular coordinate is identified by the general symbol $\theta$, the longitudinal coordinate by the general symbol z, and the radial by the general symbol r.

The degree of precision in the discrete point definition obviously involves the number of points used. In other words the finer the resolution, the more precise the surface definition.

For convenience let it be assumed that there are a total of n increments around axis 22 so that each angular increment corresponds to 360/n degrees. In the longitudinal direction, the increments are typically quite small, generally thousandths of an inch or less.

On this basis it can be appreciated that at each z coordinate, surface 20 is defined by a sub-set of n data points each corresponding to a radial at each of 360/n increments about axis 22. Stated another way, the part surface definition at each z coordinate may be considered as a one dimensional matrix of 360/n radials. If there are m longitudinal increments, the entire surface is defined by a two-dimensional $n \times m$ matrix of the radials.

Figures 3, 4, 5:
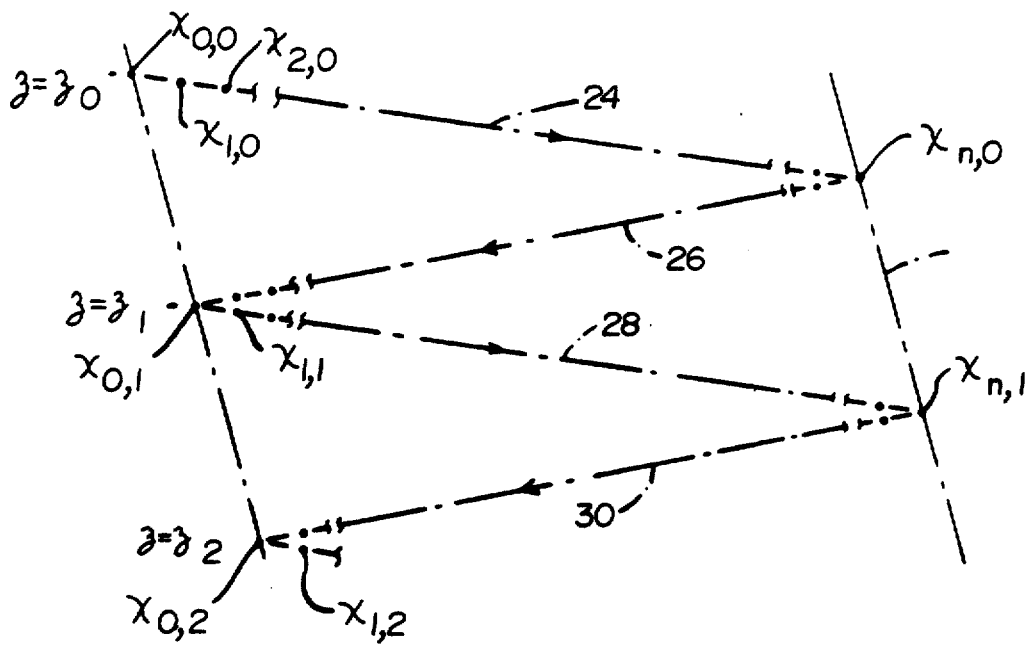
FIG. 3 is a view representing a mathematical definition of the surface represented by FIGS. 1 and 2.
FIG. 4 is a view similar to FIG. 3 corresponding mathematical definition of tool position with the mathematical definition of part surface portrayed by FIG. 3.
FIG. 5 is a diagrammatic view useful in conjunction with FIG. 4 in explaining a representative complex turning operation.

In the disclosed embodiment $n=360$ so that there are 360 one degree increments about axis 22. In other words n runs from zero to 359 for each of m axial increments along the length of axis 22. The number of m increments depends upon the relation of the turning speed of the part and the axial feed rate of the tool as it makes its pass axially along the part and also to the part length. FIG. 3 illustrates this mathematical $n \times m$ matrix definition of surface 20.

In the case of a complex piston, the turning machine of the present invention operates on a rough piston to cut the skirt to the size and shape of surface 20. The turning machine utilizes a mathematical surface definition such as that represented by the matrix of FIG. 3 to generate the appropriate motion of the cutting tool relative to the piston. The means by which this is accomplished will be explained in the later description. For now, a further diagrammatical description of how the part surface definition matrix is used in establishing the cutting tool motion is given with reference to FIGS. 4 and 5.

As the piston turns about axis 22, its angular position about axis 22 is continuously monitored. Because the angular position of the cutting tool relative to axis 22 is known, and is essentially constant if the cutting tool tip oscillates substantially coincidentally with a radial to axis 22, the monitored angular position can be used to determine the angular coordinate of the part which is being presented to the cutting tool tip at any given instant of time as the piston rotates.

Similarly if the longitudinal position of the part relative to the cutting tool is continuously monitored, the axial location of the cutting tool tip relative to the piston is also known at any given instant of time.

Therefore at any given instant of time, these two conditions define the point on the piston which is being presented to the cutting tool tip. The turning machine of the present invention operates to act upon these two conditions, and the particular part program being executed by the CNC, to continuously position the cutting tool to the appropriate radial location so that the desired surface is cut in the piston skirt.

This relationship is portrayed mathematically with reference to FIG. 4. The tool radial position is called the tool position profile and it is shown to be a function of the part surface definition matrix, and axial and angular positions of the tool relative to the part. The axial and angular positions are, of course, inherently also related to the respective axial and angular velocities.

For convenience let it be assumed that the z-axis velocity, or feedrate, of the tool relative to the workpiece is constant and let it be further assumed that the surface which is to be cut in the part is a complex one like that described with reference to FIGS. 1 and 2. In order to cut an elliptical contour, it will be perceived that for each 180 degrees of rotation of the part, the cutting tool must make one complete radial reciprocation relative to the axis 22, i.e. one full oscillation. In other words for each revolution of the part, it is necessary for the tool to reciprocate radially inwardly and outwardly twice because of the nature of the elliptical contour.

For further convenience in description let it be assumed that the general variable x represents the radial tool position relative to axis 22. For the illustrated example where there are 360 data points once around the circumference of the part, the control operates to generate a corresponding sequence of 360 data points for the tool position. In other words for the mth subset of the part position matrix, the control generates a corresponding set of data points for the variable x, i.e. it generates the tool position profile.

FIG. 5 illustrates the relation of these x data points to the oscillating radial motion of the cutting tool. If it is assumed that the part is circumferentially located such that one end of the major axis of the elliptical cross section is presented to the cutting tool tip, the cutting tool must advance radially inwardly over the ensuing 90° of part rotation since the minor axis of the ellipse is 90 degrees from the major axis. Because 90 degrees of part rotation provides 90 data points, there is a corresponding set of 90 data points generated for the variable x and these are depicted in FIG. 5 as occurring along the imaginary straight line segment 24. When an end of the minor axis of the ellipse is presented to the cutting tool tip, the cutting tool must then reverse direction so as to move radially outwardly during the next 90 degrees of part rotation. A second set of 90 data points defining the part surface between 90 and 179 degrees of part rotation causes a corresponding set of 90 data points to be generated for the variable x. These 90 data points are indicated along the imaginary line 26 in FIG. 5. Based upon the description just given, the reader will appreciate that the cutting tool has executed one full oscillation during 180 degrees of part rotation. The secon oscillation is portrayed by the segment 28 with its x data points being generated by the part rotation between 180 degrees and 269 degrees and by the segment 30 with its x data points generated by quadrant of part rotation from 270 degrees to 359 degrees.

FIG. 5 is an exaggerated form for illustrative purposes, and it shows that axial taper is being imparted to the part because each oscillation of the tool moves progressively increasingly radially inwardly. This taper is represented by drawing an imaginary line 32 through the radially innermost points of tool tip travel during each oscillation and a corresponding line 34 through the radially outermost points. If there were no taper to the part the lines 32, 34 would be parallel to axis 22.

The process continues in this manner until the entire part surface definition matrix has been processed by the control to produce a corresponding pattern of motion to the cutting tool resulting in the creation of the desired shape of the part being turned.

The x data points which are generated by the control are acted upon to produce the corresponding motion of the cutting tool. Although the data is presented in digital form, the physical characteristics of the machine including both its mechanical and electronic components, coact such that a smooth machining action results. This is accomplished through the appropriate selection of the increments and/or through the characteristics of certain components of the system; for example in the electronics digital-to-analog conversion may be used.

With this description of how the tool operation is mathematically related to the part surface definition, details of the machine itself can now be considered.

Figure 6:
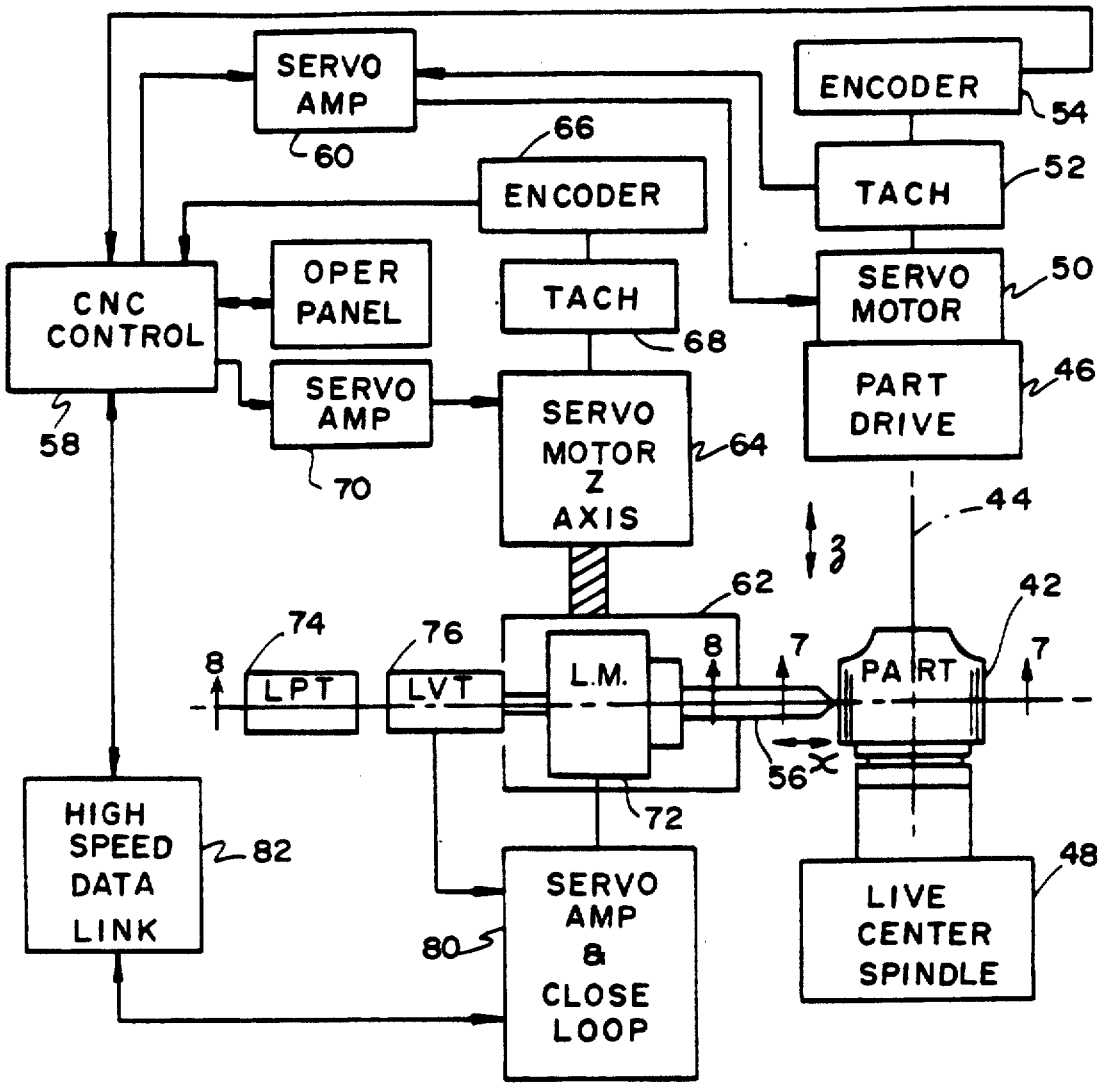
FIG. 6 is a general schematic block diagram of a machine embodying principles of the present invention.
Figure 7:
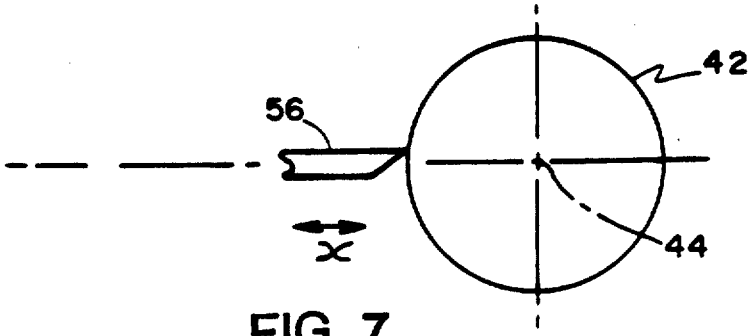
FIG. 7 is an enlarged view taken generally in the direction of arrows 7—7 in FIG. 6.

FIGS. 6 and 7 illustrate in a general way the overall organization and arrangement of a presently preferred embodiment of turning machine 40 according to the invention. The machine is illustrated for use in turning the skirt of a piston 42 which is suitably co-axially chucked and rotated about an axis 44 by means of a drive 46 and a live center spindle 48. This arrangement for chucking and rotating a part is conventional.

The rotation for drive 46 is delivered by a servomotor 50. A tachometer 52 and an encoder 54 are operatively coupled with the servo motor to develop electrical signals which are utilized by machine 40. Tachometer 52 provides a signal representative of the instantaneous velocity of rotation, i.e. the turning speed, while encoder 54 provides a signal indicative of the instantaneous rotational position. The encoder and tachometer are conventional devices, and although it is known that the position and speed of a rotating shaft are mathematically related, it is deemed preferable to utilize two separate sensors to provide the respective speed and position information, rather than a single sensor.

By way of example, encoder 54 may be a digital device which provides a digital signal indicative of the instantaneous rotational position in any convenient unit of measurement. For convenience the digital signal may be provided in terms of one degree increments of rotation about axis 44 and in this way is representative of instantaneous rotational position of piston 42 as it rotates about axis 44 relative to a circumferential point of reference. It will be appreciated that the signal repeats every complete revolution, but that during a revolution, each one degree increment is uniquely identified. By the proper circumferential mounting of piston 42 on the live center spindle and part drive, the point on the circumference of the piston skirt which is being presented to the tip of a cutting tool 56, is always correlated with the signal provided by encoder 54 so that the encoder signal, at any instant of time, uniquely identifies the circumferential coordinate which is being presented to the cutting tool tip.

The signal from encoder 54 is supplied to a CNC control 58. The manner in which the encoder signal is acted upon by CNC control 58 will be explained later.

The signal from tachometer 52 is fed back to a servo amplifier 60 which controls the speed of servo motor 50. The servo amplifier 60 is of a conventional construction to perform a closed loop control of the servo motor with the tachometer 52 providing velocity feedback information utilized in the closed loop control.

The command input to servo amplifier 60 is delivered by CNC control 58, and is to establish the appropriate turning speed.

As will be appreciated from the early introductory description, tool 56 is caused to do an axial pass along the skirt of piston 42, and it is also concurrently caused to execute small radial oscillations relative to axis 44 to impart eccentricity to the skirt.

The axial component of motion of the tool relative to the part is provided by means of a slide 62 which is fed in a direction parallel to axis 44. For convenience this is identified as the z-axis *or the feed direction*.

The z-axis feed is performed by means of a servo motor 64 which is operatively coupled with slide 62 by any suitable mechanical mechanism, for example a ball screw and nut.

Servo motor 64 is a conventional device, and its shaft position and speed are monitored by an encoder 66 and a tachometer 68 in a similar manner to the monitoring of servo motor 50 by tachometer 52 and encoder 54. Tachometer 68 and encoder 66 provide feedback information to CNC control 58.

The CNC control forms a part of the closed loop control of servo motor 64 by issuing appropriate signals to a servo amplifier 70 which in turn controls servo motor 64. The CNC control receives a program input which establishes the appropriate z-axis feed rate for the particular part involved, and the closed loop control operates to control the speed of servo motor 64 such that the appropriate z axis speed rate for slide 62, and hence like feedrate for cutting tool 56 axially along the piston skirt, are produced.

The radial component of motion for the cutting tool, which for convenience will be referred to as x-axis motion *or motion in the depth-of-cut direction*, is imparted by a closed loop system which includes electronic and mechanical components. These will be described in considerably greater detail later on. With reference to FIGS. 6 and 7 they are defined generally to include a linear *servo* motor 72 which is carried on slide 62. In this way the combined z and x axis motions are imparted to the cutting tool by means of the combined operation of servo motor 64 and linear motor 72.

Linear motor 72 is a part of another closed loop control system which is used to achieve precise control of the x-axis motion of the cutting tool. Instantaneous position is monitored by a linear position transducer 74 and instantaneous velocity by a linear velocity transducer 76. These two transducers provide feedback signals to a servo amplifier and closed loop control 80 which controls linear motor 72. The input command *signal* to servo amplifier and closed loop control 80 is received from CNC control 58 via a high speed data link 82. An operating panel 78 is associated with CNC control 58 and is adapted to receive the part program which is to be executed.

Briefly, CNC control 58 issues commands *or an initial control signal* developed from a program defining the part surface to be generated, for example as described above with reference to FIGS. 1, 2 and 3, and servo amplifier and closed loop control 80 acts upon the commands to provide *or develop a* corresponding *final* control [signals] *signal* to the linear motor 72 to achieve the desired control of the tool x-axis position. For example, in the case of an elliptical contour, servo amplifier and closed loop control 80 serves to generate two oscillations of cutting tool 56 for each revolution of the piston 42.

As can be seen in FIG. 7 the cutting tool tip may be slightly offset from the center line of the linear motor, but the x-axis motion is either exactly or at least substantially along a radial relative to axis 44. In this way, the position of the tip of the cutting tool is caused to describe the desired surface which is to be imparted to the piston skirt.

FIGS. 8, 9, 10, and 11 illustrate in detail the mechanism by which x-axis motion is imparted to cutting tool 56. The mechanism comprises a head 82 which is mounted by any suitable means on slide 62. Head 82 comprises a base plate 84, a rear plate 86, a top cap 88, and a top cover 90 assembled together and forming an enclosure for linear motor 72 and the two transducers 74, 76.

Figure 8:
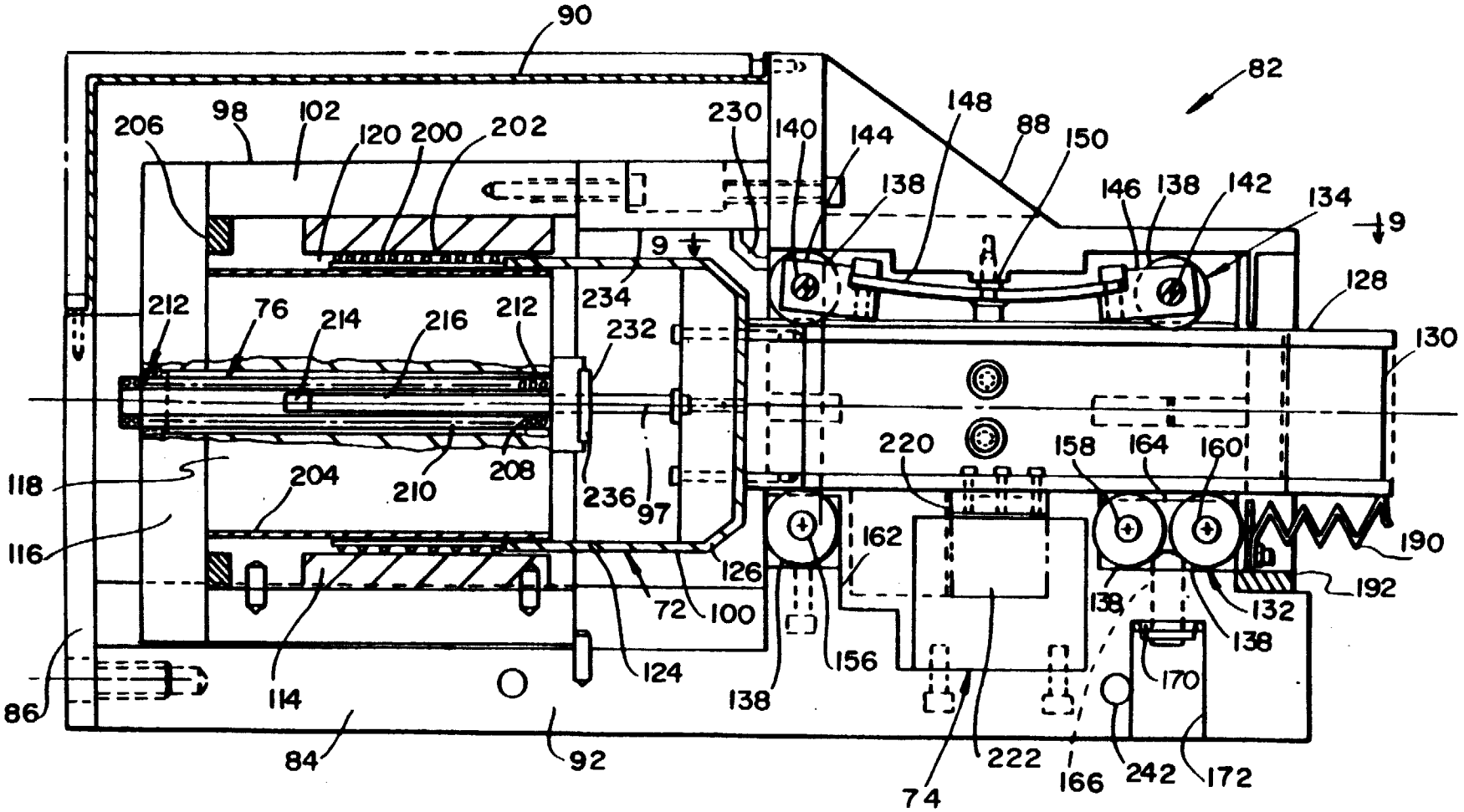
FIG. 8 is a front elevational view, partly in section, of a portion of the machine and can be considered as taken in the direction of arrows 8—8 in FIG. 6.
Figure 10:
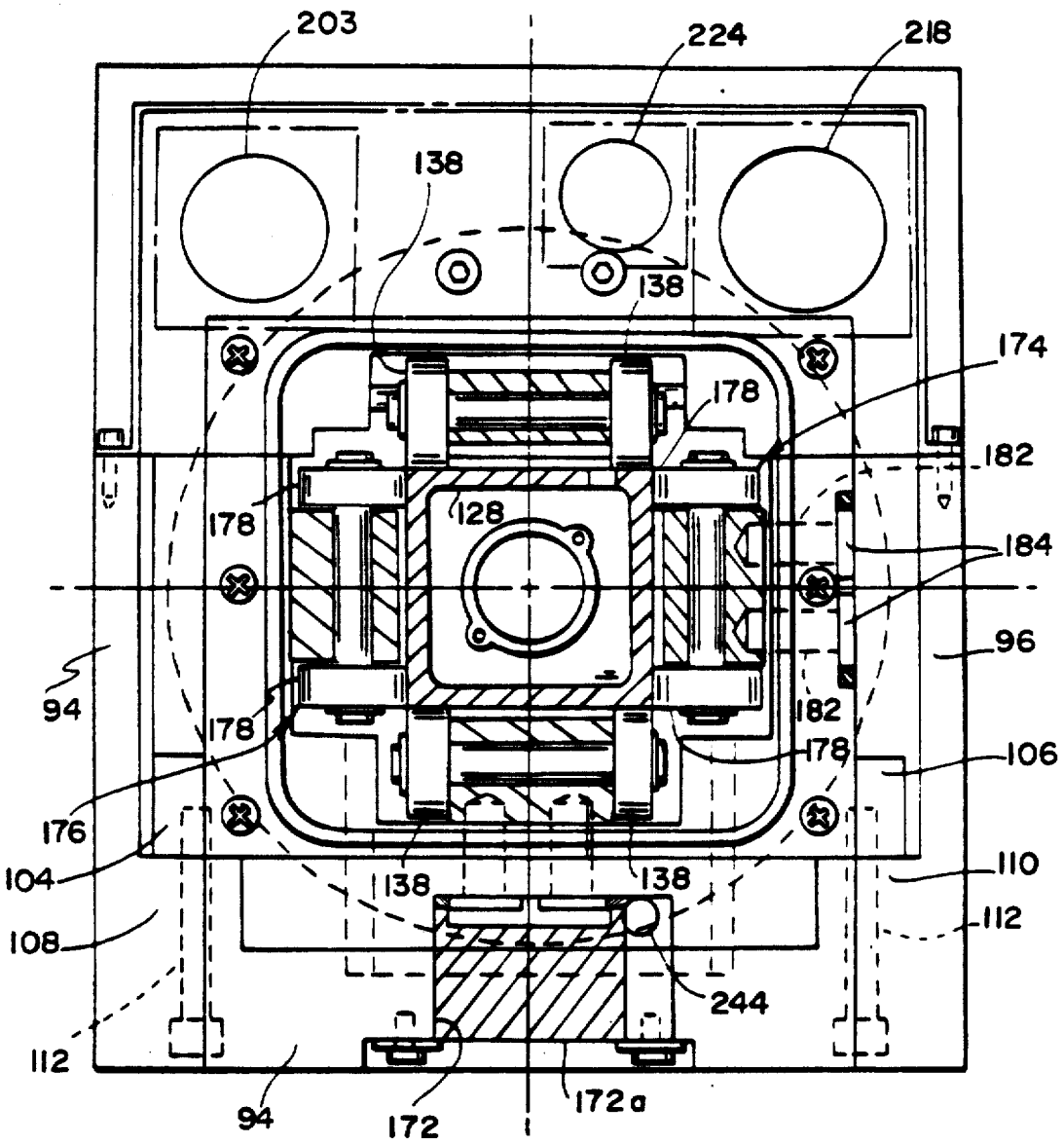
FIG. 10 is a transverse cross sectional view taken generally in the direction of arrows 10—10 in FIG. 9.

As can be seen from consideration of FIGS. 8 and 10, base plate 84 comprises a horizontal bottom wall 92 and upright side walls 94, 96. Hence, as viewed lengthwise of the x-axis in FIG. 10, base plate 84 can be considered to have a generally U-shaped cross section.

At the forward end, i.e. the right hand end as viewed in FIG. 8, base plate 84 is covered by top cap 88; the rear, or left hand, end is enclosed by top cover 90. Linear motor 72 is enclosed within the rear portion of the head and has an axis 97 along which it acts.

Linear motor 72 comprises a magnet assembly 98 and a coil assembly 100. Magnet assembly 98 has an annular shape and an axis concentric with the axis 97. Coil assembly 100 also has an annular shape and is coaxial with magnet assembly 98.

Magnet assembly 98 comprises a frame 102 of generally annular shape having a pair of bars 104, 106 (see FIG. 10) fixed to the outside to provide for its mounting on base plate 84. These bars rest on ledges 108, 110 of base plate 84, and frame 102 is securely attached to the base plate by screws 112 passing through suitable holes in the base plate bottom wall and into tapped holes in the bars 104, 106.

Magnet assembly 98 further comprises a magnet 114 disposed concentrically within frame 102. Magnet 114 has a circular annular shape and is of a length less than that of the frame. It is affixed within the frame in any suitable manner so as to be coaxial with axis 97.

Magnet assembly 98 is enclosed at its rear axial end by means of an end plate 116 attached to frame 102. A central cylindrical hub 118 is mounted on and projects forwardly from end plate 116. In cooperation with magnet 114, hub 118 defines a circular annular free space 120, and it is within this annular free space that a rear portion of coil assembly 100 is disposed.

Coil assembly 100 comprises a circular tubular wall 124, or bobbin, which attached by means of a cap 126 at its forward end to a carriage 128. Carriage 128 in turn projects forwardly from cap 126 to terminate at a forward end containing a suitable tool mount 130 for tool 56.

Carriage 128 is illustrated as a hollow tubular bar having an axis coincident with axis 97 and having a square transverse cross sectional shape as best seen in FIG. 10. The carriage axis is parallel to the x-axis, and the carriage is arranged for axial motion by linear motor 72. Carriage 128 is accurately guided on head 82 by sets of rollers. The rollers provide for low friction mounting, yet are sufficient to react cutting loads so that at all times during turning operations the cutting tool is enabled to accurately follow commands and cut a desired surface on the part being turned.

The rollers for guiding carriage 128 are arranged in sets. For convenience these are referred to as a vertical acting set and a horizontal acting set. The carriage is vertically constrained by the vertical set of rollers, and it is horizontally constrained by the horizontal set of rollers.

The vertical set is seen with reference to FIGS. 8 and 10 where it is shown to comprise a lower half-set 132 and an upper half-set 134. The upper half-set 134 is spring-loaded while the lower half-set 132 is not.

The upper half-set comprises four individual circular rollers, or wheels, 138 of identical size. Two of these rollers are on the ends of a rear axle 140 while the other two are on the ends of a forward axle 142. The rear axle 140 is supported on a rear yoke 144 and the forward axle 142 on a forward yoke 146. The two yokes 144, 146 are joined together by a leaf spring assembly 148 which extends axially between a forward portion of rear yoke 144 and a rearward portion of forward yoke 146. The attachment of the leaf spring assembly to the yokes is by any suitable means, such as by screws passing through apertures in the leaf spring assembly and into tapped holes in the yokes. The leaf spring assembly is centrally disposed, as viewed in FIG. 10.

The leaf spring assembly is further provided with one or more apertures located centrally of its length for attachment to the underside of top cap 88 as at 150. The attachment is made by any suitable means such as one or more screws passing through one or more apertures in the leaf spring assembly and into a corresponding tapped hole or holes in top cap 88. Spacers may or may not be used, as required.

The lower half-set 132 comprises a total of six rollers 138. Two of these rollers are in the rear and mounted on an axle 156 which is below axle 140. The remaining four rollers of the lower half-set are arranged in pairs on respective axles 158, 160.

The rear axle 156 is mounted on a yoke which is securely fastened to a ledge 162 of base plate 84. The two forward axles 158, 160 are on a yoke 164 which is capable of a certain amount of adjustment.

Figure 11:
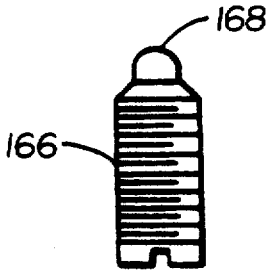
FIG. 11 is a view showing a component in greater detail.

A pair of holes are provided in the bottom surface of yoke 164 and the distal ends of a corresponding pair of screws 166 pass into these holes. Details of each screw 166 are shown in FIG. 11. The distal end of the screw is rounded at 168 to provide a bearing surface on which the frusto-conically tapered end of the corresponding yoke hole seats. The screws are threaded into tapped holes in base plate 84 so that each screw is capable of being vertically adjusted. In this way it is possible to vertically position the forward set of four rollers. Once a desired adjustment has been obtained, the screws are locked by means of jam nuts 170. The screws and jam nuts are accessible via suitable tools (not shown) which are introduced into a recess 172 to obtain the access. After adjustment and locking of the screws, recess 172 may be closed by a suitable plug 172a.

Thus, the upper half-set 134 comprises four rollers which exert downward forces on the carriage at spaced apart points, and the lower half-set 132 provides subjacent support. The top cap is shaped on its interior face to accommodate the upper half-set of rollers. The magnitude of the spring-loading is a function of the leaf spring characteristics and the amount of deflection thereof. Specific details of any given construction will depend upon the cutting loads anticipated, with the spring force being sufficient to prevent load-induced deflections. It is contemplated that a leaf spring assembly may comprise single or multiple leaves.

This arrangement provides a secure mounting of the carriage on the head, for guidance and load reaction purposes, yet allows the carriage to reciprocate axially along the axis with minimal resistance.

The horiziontal set of rollers is analogous to the vertical set in that it comprises two half-sets, one to each horizontal side of carriage 128. As viewed in FIG. 10, one half-set 174 is to the right side, and the other half-set 176 is to the left side.

Figure 9:
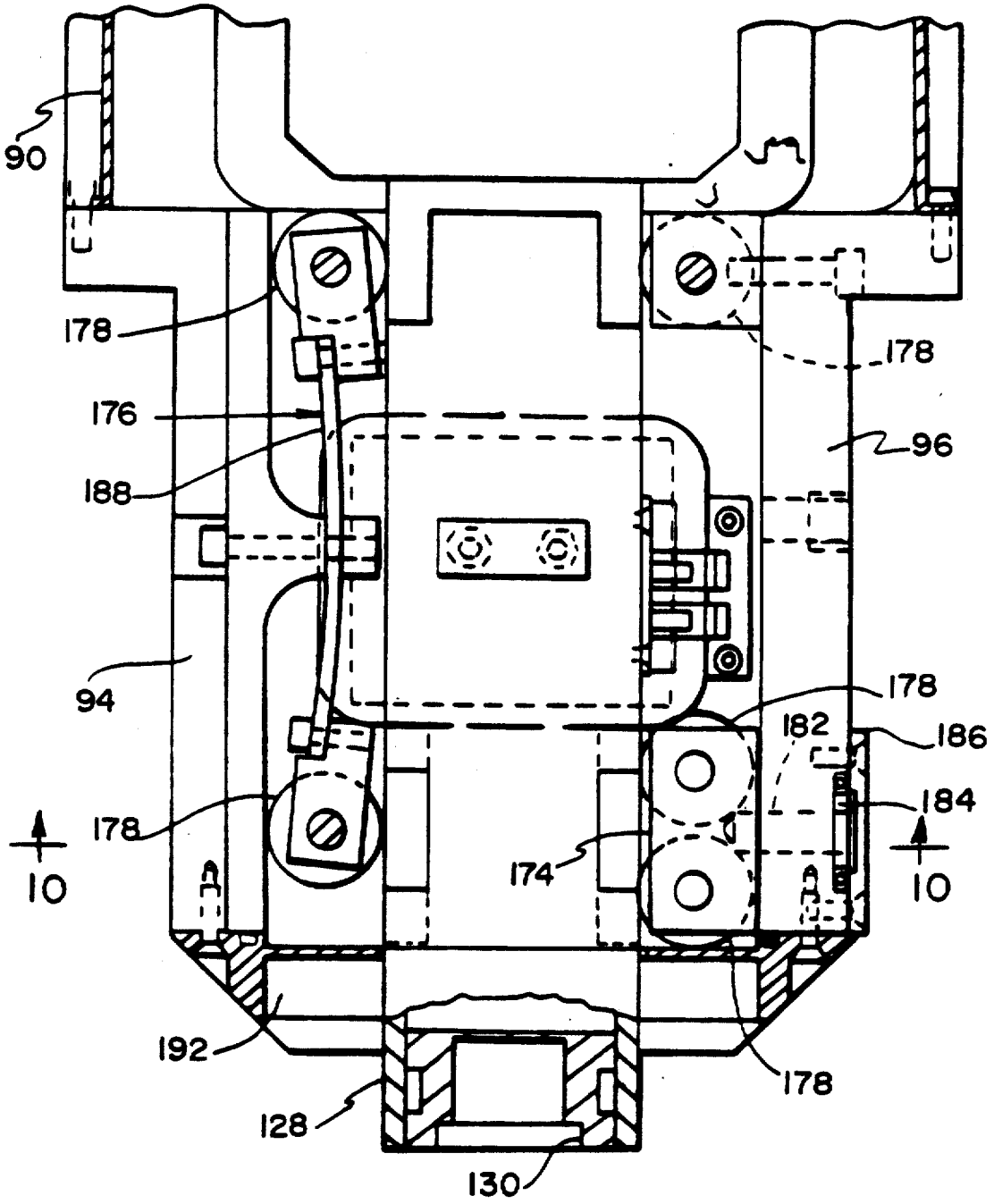
FIG. 9 is an enlarged fragmentary view taken generally in the direction of arrows 9—9 in FIG. 8, but with portions broken away for illustrative purposes.

The half-set 174 is analogous to the lower half-set 132 just described and the half-set 176 is analogous to the upper half-set 134. Each of the ten rollers in the horizontal set is identified by the reference numeral 178. They are arranged such that there are six rollers 178 in half-set 174 and four rollers 178 in the half-set 176. The six rollers of half-set 174 are arranged in exactly the same manner as the six rollers 138 of the lower half-set 132; in other words, one pair are on a yoke at the rear and the other two pairs on a forward yoke. The forward pairs are laterally positionable relative to the carriage axis in the same manner as yoke 164 is vertically positionable. The two screws and jam nuts for laterally positioning the two forward pairs of rollers of half-set 174 are designated by the reference numerals 182 and 184 respectively. After the appropriate adjustments and locking have been made, access is prohibited by a cover plate 186 attached to the outside of base plate 84. (FIG. 9).

The half-set 176 is spring-loaded in the same manner as the upper half-set 134, comprising a leaf spring assembly 188 attached centrally of its length to the side wall 94 of base plate 84. With this arrangement, the horizontal set confines carriage 128 horizontally for guidance and load reaction purposes, yet allows the carriage to reciprocate axially with minimal resistance.

A protective bellows 190 serves to seal the interior of the head around the carriage in the area where cutting activity takes place. The bellows comprises a smaller four-sided aperture at its forward end which fits in a sealed manner around the forward end of carriage 128 and extends rearwardly to a layer fourside rear aperture which attaches via a mounting ring 192 to the front of head 84 in a sealed manner. The bellows is constructed from a sturdy and durable material for protective purposes, yet it has sufficient flexibility that it imposes no significant restriction in the translation of the carriage on the head.

Further details of linear motor 72 will now be described. A layer of copper 204 is applied onto the outside of hub 118 and a soft copper ring 206 located as shown at the joint between frame 102 and end plate 116. Magnet 114 is polarized to issue a magnetic flux which passes through free space 120. A very uniform magnetic field is created in the free space 120, and it is within this free space that an electric coil 200 of coil assembly 100 is disposed.

Coil assembly 100 may comprise a suitable slot 202 within which the coil is securely disposed. The coil is energized with an electric current and depending upon the magnitude of this electric current, there will be a certain degree of interaction between the magnetic field created by magnet 114 in free space 120 and the magnetic field created by the electric current flowing in the coil. The consequence is that an axial force is applied to the coil, and hence also exerted on the entire coil assembly and carriage. This force is effective to selectively position the carriage with the positioning being a function of the magnitude of the current introduced into coil 200. In other words, by controlling the current in coil 200, the motion of carriage 128 is also controlled, and in the present invention the reciprocation of the cutting tool is therefore controlled by control of the current in coil 200. Wires from coil 200 extend to a plug 203 via which a connection is made to the control.

The two sensors 74 and 76 associated with linear motor 72 are also contained within the interior of head 82. The LVT sensor 76 is embodied as a coil 208 disposed on a tube 210 which is inserted coaxially through a suitable hole in end plate 116 and hub 118. The hole in the end plate and hub may be larger than the OD of the tube and coil and therefore bushings 212 may be used at the ends to securely support the tube. A core 214 is disposed within tube 210 and is connected by a rod 216 to cap 126. Reciprocation of carriage 128 by linear motor 72 causes a similar reciprocation of core 214 within tube 210. This develops a signal in coil 208 corresponding to the instantaneous velocity and the coil is connected via lead wires to a plug 218 via which a connection is made to the control.

The LPT sensor 74 is located more forwardly. This sensor is a high precision device capable of very fine resolution. An example of such a device is Heidenhaim sensor. It comprises a scale 220, in the form of a grating, attached to carriage 128, and a sensing head 222, fixedly mounted within head 82 in confrontation with scale 220. Lead wires extend from sensing head 222 to a plug 224 which delivers the LPT signal to control 80.

There are two additional sensors also located within the head. One sensor is a home sensor for establishing a home position for the carriage, and the other is an on-scale sensor for sensing when the scale 220 is active on the sensing head 222. (These are portrayed schematically in FIG. 12C, to be described later).

The range of travel of carriage 128 on the head is greater than the limited range within which complex turning operations are conducted. Hence the precision LPT sensor 74 is active only over a limited extent of the total possible range of travel of the carriage.

At the beginning of a turning operation, the carriage is extended forwardly from the home position to a position where actual cutting takes place. In this regard it can be appreciated that the home sensor and the on scale sensor provide the appropriate control functions whereby the carriage may rapid advance from the home position until it comes on scale at which time sensor 74 assumes control and precision turning operations are conducted. At the conclusion of the precision turning operations, the carriage can rapidly retract to the home position.

The range of travel of the carriage is limited by crash stops 230 and 232. These crash stops are arranged within head 82 to act on cap 126. A spacer member 234 is attached between frame 102 and the rear end wall of top cap 88. Crash stop 230 is attached within head 82 where the interior of spacer member 234 abuts the end surface of top cap 88.

The other crash stop 232 is in the form of a circular annular member 236 mounted on the forward end of hub 118 concentrically with the axis. The rod 216 which connects from cap 126 to core 214 passes centrally through crash stop 232. The rearward travel of the carriage is limited by abutment of the rear axial face of cap 126 with crash stop 232, and forward travel by abutment of the chamfer at the forward perimeter of cap 126 with crash stop 230. The purpose of the crash stops is to prevent undesirable overtravel of the carriage, and in the usual machining operations they do not come into play. Rather they come into play such as when improper control is introduced into coil 200 which otherwise would cause undesired, and potentially damaging, overtravel.

All three plugs, 203, 218, and 224 are mounted in top cover 90, and each mates with a corresponding connector via which circuit connection is made to the control.

The top cover is a formed part attached by screws so as to be conveniently removable for access to the interior of the head at the rear. The remainder of the head structure is constructed of sturdy parts to support the carriage and voice coil motor.

In use, head 82 is enclosed. It may be desirable to provide a certain air circulation within the interior but without introducing any undesired contamination. This can be done by means of an inlet and outlet port (not shown) for example through baseplate 92, with filtered air being the medium circulated. The various component parts are assembled together in a conventional manner to construct the head. After assembly, adjustment of the rollers will typically be required to insure that the carriage motion follows the intended path. For alignment of the carriage on the head a pair of holes 242, 244 are provided, and these may be used to attach indicators or other pieces of equipment which are used to perform the alignment. Once the desired alignment has been obtained by the adjustment of the rollers, the adjustment screws are locked in place by the jam nuts.

Because of concern about the mass of the carriage and those parts which move with the carriage, they are made of strong light-weight materials, such as titanium. In order to obtain the best possible characteristics for the magnetic field, magnet 114 is constructed from an exotic alloy such as samarium cobalt.

During turing operations, the current in coil 200 is controlled in such a way as to create the desired oscillatory motion of the carriage and cutting tool. Hence the control current in the coil will contain an oscillatory component corresponding to the oscillatory motion desired. Exactly how this oscillatory current is developed can be better understood for consideration of FIGS. 12A, 12B and 12C and the ensuring description.

Figure 12A:
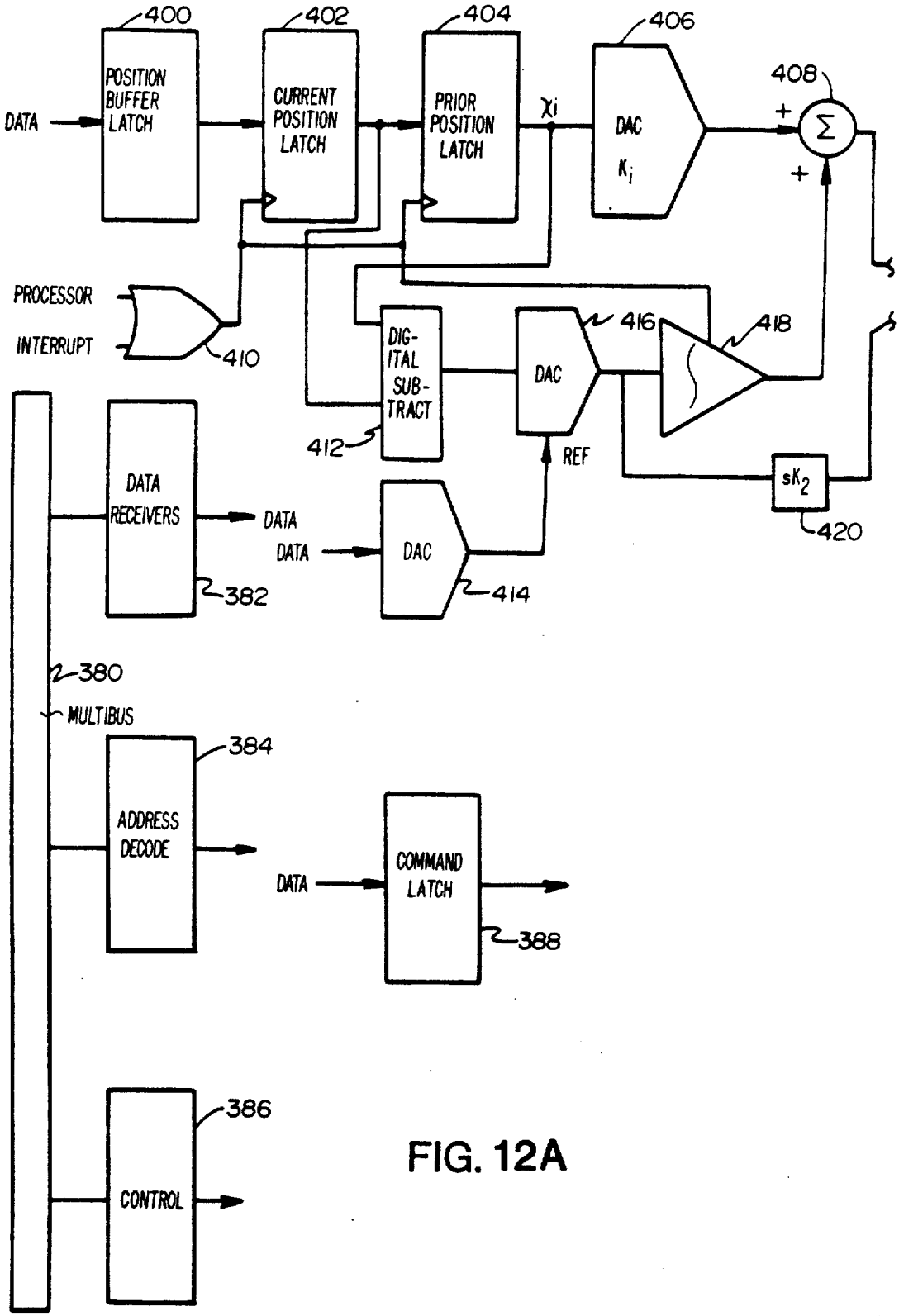
FIGS. 12A, 12B and 12C should be considered together and constitute a block diagram illustrating a portion of FIG. 6 in greater detail.
Figure 12B:
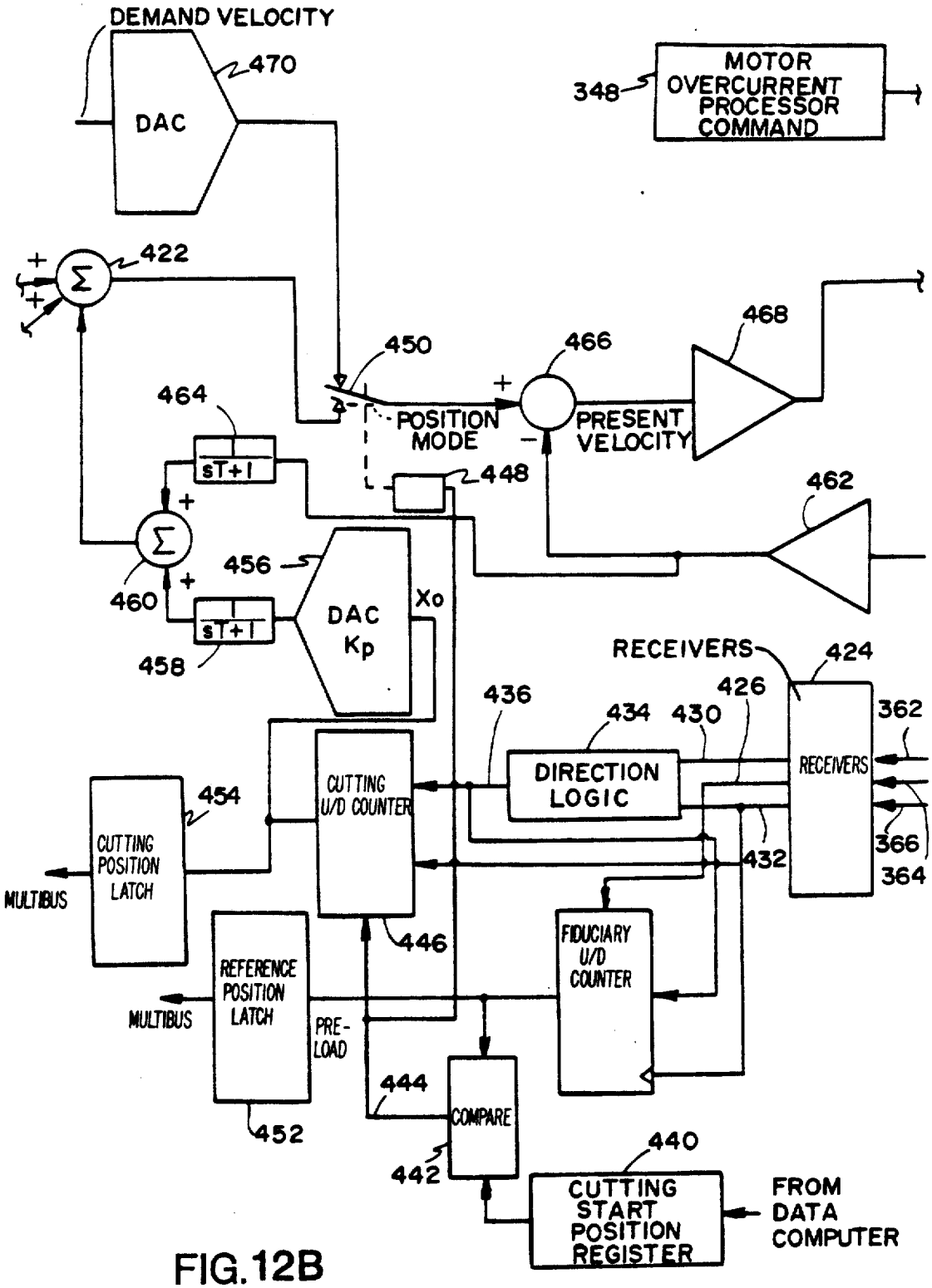
Figure 12C:
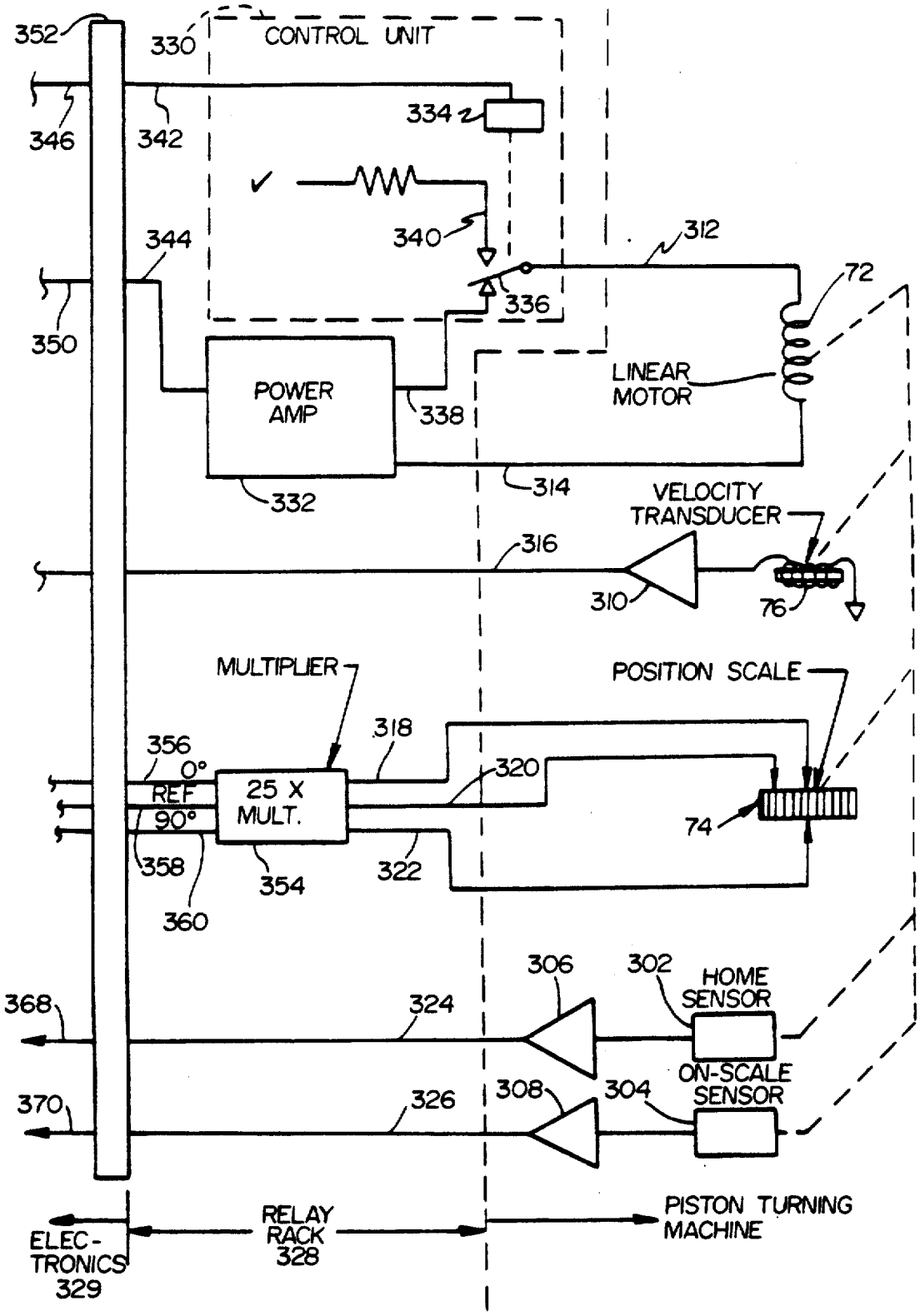

FIGS. 12A, 12B, and 12C should be considered together and constitute a more detailed schematic diagram. Looking first to FIG. 12C, the reader will observe that linear motor 72 and sensors 74 and 76 are schematically portrayed. Also schematically portrayed are the home sensor and on-scale sensor previously referred to and now identified by the respective reference numerals 302 and 304. These two sensors have respective amplifiers 306 and 308, and an amplifier 310 is also associated with LVT sensor 76. These components just described are all contained within head 82. Their operative coupling with control 80 is via plugs 203, 218 and 224.

Wires 312 and 314 serve to connect linear motor 72 with control 80. Wires 316, 318, 320, 322, 324, and 326 connect the various sensors with the control. Control 80 contains a relay rack portion 328 and an electronic portion 329. Some of the wires from head 84 connect to devices in relay rack 328 while others pass through to the electronic portion 329.

Relay rack 328 contains a control unit 330 and a power amplifier 332 both of which are associated with linear motor 72. Control unit 330 comprises a relay coil 334 controlling a moveable contact 336. Wire 312 connects to moveable contact 336 and the contact is controlled by coil 334 in the following manner.

In one condition of coil 334, the contact 336 is connected (as shown) to a wire 338 leading from power amplifier 332. In other words in this condition of coil 334, power amplifier 332 controls linear motor 72.

When coil 334 is operated to another condition, contact 336 is moved to connect wire 312 to another wire 340 leading to a voltage reference V. In this condition, the voltage V controls linear motor 72, causing tool retraction.

Wires 342 and 344 extend from control unit 330 and power amplifier 332 respectively. Wire 342 connects to a wire 346 from a motor overcurrent processor command 348. The motor overcurrent processor command 348 controls the condition of coil 334 and hence controls whether the motor is being operated by power amplifier 332. or by the voltage V.

Wire 344 connects to a wire 350 via which a command signal is supplied to power amplifier 332. When power amplifier 332 is connected to motor 72 by contact 336 being in the condition shown in FIG. 12C, the command signal supplied by wire 350 controls the motor. The connection of the power amplifier and control unit to the wires 346 and 350 is via a connector and plug 352 which is shown to provide additional connections for other wires between relay rack portion 328 and the electronics portion 329.

Relay rack portion 328 also contains a multiplier 354 which is cooperatively associated with sensor 74. The three wires 318, 320, and 322 are inputs to multiplier 354 and there are three output wires 356, 358, 360 from multiplier 354. These latter wires connect through connector and plug 352 to respective wires 362, 364, 366.

Sensor 74 *or scale reference system* provides output signals on the lines 318, 320 and 322 as the scale *of the system* moves past the sensing head *of the system*. Lines 318 and 322 deliver respective squarewaves which are phased 90 degrees apart from each other. As can be appreciated, the frequency of the two signals is related to the velocity of movement and because of the mathematical relationship of distance to velocity position information is also provided. By including the relative 90 degree phasing, the two signals delivered by lines 318 and 322 also contain directional information.

The signal delivered via channel 320 is a reference position marker signal representing a predetermined location along the scale. This location is used as an absolute reference position.

Multiplier 354 acts upon the signals to enhance the resolution. Multiplier 354 is a standard device which is manufactured also by the same company that manufactures sensor 74.

Wires 368 and 370 are connected via connector and plug 352 with the respective wires 324 and 326.

Thus FIG. 12C generally relates the earlier description of the associated components with the generalized block diagram of FIG. 7. Attention can now be focused on further details of control 80 with reference to FIGS. 12A and 12B.

In FIG. 12A a multibus 380 interfaces control 80 with the CNC 58 via high speed data link 82. Multibus 380 serves a number of devices in control 80 which are illustrated generally to comprise data receivers 382, address decoding 384 and control 386. The inputs to multibus 380 are in digital form and collectively define data information, address information, and control information. For example, the data information represents x-axis position information to command positioning of the carriage; address information identifies particular devices within control 80 which are to receive the data information or control information; and control information in conjunction with address information controls the flow of data information within control 80, or control information can issue direct commands to certain devices. A block labeled command latch 388 can latch data. It will be appreciated that these devices have been generally portrayed in FIG. 12A and that in the actual implementation of a control, there are specific lines connecting the various devices so that the inputs received on multibus 380 are properly utilized.

Still referring to FIG. 12A, it will now be explained how x-axis control of the carriage is accomplished. Input data representing tool x-axis position commands is input to a position buffer latch 400. Position buffer latch 400 in turn connects to a current position latch 402 which itself in turn connects to a prior position latch 404. In operation, the flow of input data is sequentially from latch 400 to latch 402 to latch 404. In other words data is sequentially moved from a preceding latch to a succeeding latch. The rate is a function of the speed at which the piston is being turned and the value of n. If it is assumed that n=360 and the piston turning speed is 40 r.p.s., then the rate of data flow is 14400 hz. Thus the latches 400, 402, 404 may be considered to form a channel with the output of latch 404 providing an instantaneous demand position in digital form.

A digital-to-analog converter (DAC) 406 converts the digital demand position into an analog one. This is supplied as an input to a summing junction 408. For convenience the instantaneous demand position will be designated $x_i$.

A gate 410 receives two inputs entitled "Processor" and "Interrupt". The output of the gate in turn connects to latches 402, 404. Under normal turning operations, data passes sequentially through the channel in the manner just described. However certain conditions may call for interruption and this is done by the actuation of gate 410 acting upon the latches 402, 404.

The processor and interrupt signals represent control signals received from the CNC 58 and/or control panel 78.

The output of latch 402 is supplied to one input of a digital subtract circuit 412 while the output of latch 404 is supplied to the other input of the digital subtract circuit. The digital subtract circuit subtracts the two signals to yield an output signal corresponding to the difference between the current position and the prior position as registered by the two latches 402, 404. At any instant of time the output of digital subtract circuit 412 represents the size of the next increment of x-axis motion to be commanded.

The output of circuit 412 is supplied as an input to a DAC 416. A reference input to DAC 416 is supplied from a second DAC 414, and this second DAC receives certain data. The output signal from DAC 416 is supplied both to an integrator 418 and to a circuit 420. The integrator output is connected to a second input of summing junction 408. The output of circuit 420 is connected to an input of a further summing junction 422 (see FIG. 12B). The output of summing junction 408 is also an input to summing junction 422.

The circuit containing integrator 418 is selectively used depending upon certain conditions. Basically, when used, it is intended to perform a smoothing function whereby the output of summing junction 408 may be considered to constitute a demand position "smoothed" which will result in smoother motion of the carriage.

Circuit 420 performs the transfer function $sK_2$ on $x_i$, s being the well-recognized symbol for the Laplace operator used in mathematical description of servomechanisms.

Circuit 420 provides a feed-forward signal to enhance the response of the carriage to the basic demand position. The basic demand position is transmitted from latch 404 to DAC 406 which in turn connects through summing junction 408 onto summing junction 422. Position feedback is subtracted at summing junction 422, and how the position feedback is developed will be explained later.

DAC 406 has a gain $K_i$ acting on $x_i$. Therefore, assuming that integrator 418 is inactive, the input signal to summing junction 422 is $(K_i+sK_2)x_i$. It is from this signal that the position feedback signal is subtracted at summing junction 422 to produce a position error signal used to control linear motor 72. How the position feedback signal is developed will now be explained.

Multiplier circuit 354 connects to receivers 424 via lines 362, 364, 366. An output line 426 from receivers 424 is an input to a fiduciary up/down counter 428. Two other lines 430 and 432 from receivers 424 are inputs to a direction logic circuit 434. Line 432 also connects to an input of counter 428. An output line 436 of direction logic circuit 434 is returned to another input of counter 428.

The fiduciary up/down counter 428 is intended to set an absolute reference point which is called zero reference. The zero reference is set by response to the marker signal developed on line 358 and transmitted to line 364, as explained earlier. When the marker occurs, fiduciary up/down counter circuit 428 is enabled to begin counting from zero with the count being a measurement of the travel of the carriage from the reference zero. The direction logic 434 provides the proper direction of counting so that the counter faithfully follows the carriage travel in both directions along the x-axis. Because the marker constitutes an absolute reference on the machine, the control is now related to the absolute reference.

A cutting start position register 440 is preloaded with data constituting an absolute position at which turning operations are to commence. It will be appreciated that this preload will typically be set to take into account the expected size of the part before turning so that the commencement of turning operations is slightly off the part to avoid the cutting tool inadvertently plunging into the part.

The cutting start position data in register 440 is compared with the instantaneous position registered in fiduciary up/down counter 428 by a compare circuit 422. The compare circuit has an output line 444 which causes a cutting up/down counter 446 to begin to follow the carriage travel once the carriage has traversed the offset preloaded in register 440. Counter 446 thereby takes into account the offset which has been preloaded in the cutting start position register 440 relative to the absolute reference of counter 428.

The outputs from the two counters 428 and 446 are supplied respectively to latch circuits 452 and 454 respectively. The latch circuits provide information on the multibus which is made available to the CNC.

Since the output of counter 446 represents the travel of the carriage from the cutting start position, it can be used to provide position feedback information for the closed loop control. This position feedback is designated in the FIG. 12B as $x_0$ and is supplied to a DAC 456 which has a gain $K_p$. The output from DAC 456 is an analog measurement of the instantaneous carriage position as measured from the offset. This information is processed by a circuit 458 which imposes the transfer function $$1/1+sT$$

on it, and in turn connects to one input of a summing junction 460.

Velocity feedback from sensor 76 and its amplifier 310 is transmitted through an amplifier 462 to a circuit 464 which imposes the transfer function $$1/1+sT$$

on it. The resulting signal is also supplied to a summing junction 460. The sum of the two input signals to summing junction 460 is subtracted at summing junction 422 from $K_i x_i$ to close the position feedback loop. Hence although the position feedback is composed principally of position information, it contains a component of velocity information also.

The error signal from summing junction 422 is supplied through a contact 450 to a further summing junction 466. Contact 450 is controlled by a device 448, and in this regard both device 448 and 450 could be solid-state, as well as the electromechanical depiction of the drawing. Device 448 is activated by the enablement of counter 446, and when activated it causes contact 450 to provide continuity from summing junction 422 to summing junction 466. This represents the commencement of closed-loop position control at the beginning of turning operations.

The velocity feedback from amplifier 462 is also supplied to the subtraction input of summing junction 466 and the output of the summing junction is an error signal supplied to an amplifier 468. It is this amplifier 468 which in turn supplies the command to power amplifier 332.

It is at summing junction 422 that the position error signal is created by subtracting the signal from summing junction 460 from the signal from summing junction 408. Assuming that the integrator 418 is inactive, the demand position to summing junction 422 is the sum of the signal $K_i x_i$ from DAC 406 and the signal $sx_i K_2$ from circuit 420, as noted above.

The feedback signal subtracted from the demand signal at summing junction 422 equals:

$$\frac{K_p(1 + sK_v/K_p)}{sT + 1} x_0$$

where $K_p$ represents the position feedback gain, $K_v$ represents the velocity feedback gain, and $x_0 = v/s$, where v represents the instantaneous velocity.

The position error signal is caused to satisfy the following condition:

$$x_i K_i - x_0 K_{p0} + sx_i K_2 - sK_{v2} x_0 = 0$$

where $$K_{p0} = \frac{K_p(1 + sK_v/K_p)}{sT + 1},$$

and $$K_2 = K_1(K_{v2}/K_{p0}).$$

A particularly advantageous relationship is obtained by choosing the parameter T such that the following relationship is satisfied:

$$T = K_v/K_p,$$

and by also setting $$K_2/K_i = K_{v2}/K_{p0}.$$

The selection of the individual circuit components to satisfy these relationships is accomplished through the practice of conventoinal design [techaniques] *techniques* used in electronic and servomechanism design.

When switch 450 is in the position which couples the output of summing junction 422 to the input of summing junction 466, the control assumes the position control mode of operation and it is this mode which is used during precision turning operations on a part.

From consideration of the foregoing description and the drawings, it will be further appreciated that in the position control mode of operation, the minor feedback loop providing velocity feedback is also active to modify the position error signal. This modification occurs at summing junction 466 and creates an error signal input to amplifier 468 which in turn acts upon power supply 332 to effect corresponding control of linear motor 72.

During an operating sequence on a part, the position control mode of operation may be active for only a portion of the time. A typical operating sequence involves the carriage advancing from a home, or retracted, position toward a part with the actual turning operations being allowed to commence only after the cutting tool has been brought into close proximity with the part.

Over the range of carriage advance from the home position to a position just off the part, the control operates in the velocity control mode where only the velocity feedback loop is active.

In the velocity control mode, switch 450 is operated to conduct a demand velocity signal received from the CNC and converted into an analog signal by a DAC 470 to summing junction 466. The demand velocity is set by the particular part program. The part program also sets the cutting start position register with data representing offset, or the point at which the position control mode of operation is to commence.

As the tool and carriage advance toward the part while the control is in the velocity control mode of operation, the reference marker is issued by position sensor 74 to set the absolute reference point into the control. The velocity control mode will continue until the offset, if any, has been tranversed.

Once the offset has been traversed, the position control mode begins at which time the up/down cutting counter 446 becomes active, and the contacts 450 are switched to conduct the signal from summing junction 422, instead of the signal from DAC 470, to summing junction 466.

The position data received from the CNC control and acted upon by control 80 causes input position commands to be issued to effect the closed loop position control of linear motor 72 and hence of the carriage and tool. In this regard the position commands are correlated with the rotation of the piston as provided by position encoder 54, and therefore the tool is caused to follow a path such as described above for example with reference to FIG. 4 where in turning an elliptical contour the carriage is caused to execute two oscillations per each revolution of the piston. The control operates to ensure the faithful correspondence of the cutting tool to the demand position so that the desired contour is imparted to the piston skirt. The process continues until the program has been executed at which time the carriage can be retracted to the home position.

The turning operations are conducted with efficiency and accuracy. The interaction between the control electronics and the mechanical mechanism achieves a response which enables the tool tip to closely track the desired contour to be created in the part while the part is rotating at relatively high speed. Moreover, this is accomplished without undesired deflections, tool chatter or like impediments to the machine's performance, and the mechanical construction of the head in conjunction with the linear motor are especially advantageous in enabling this outstanding performance to be attained.

While the advantageous aspects of the invention are most readily apparent when the tool is performing the finish operations because this is where the final accuracy is imparted to the piston, the invention can be used to conduct operations other than finish turning. For example, by appropriate programming of the CNC it is possible for the tool to conduct semifinish turning, grooving, and other related operations, in addition to finish turning. Therefore, a turning machine embodying principles of the invention is adapted to conduct all the necessary operations which are required in turning of a part such as a piston. Because these operations may be defined mathematically by the computer program entered into the CNC, significant accuracies and improvements in efficiencies result while at the same time the machine is endowed with versatility to produce parts of different geometrical requirements without any significant changeover.

The CNC is a conventional apparatus which is programmed in a conventional manner to cause the control to execute the above defined functions. In this regard conventional programming techniques are employed to create an operating program based on knowledge of the part geometry and the organization and arrangement of the turning apparatus. The CNC can perform the necessary calculations on a realtime basis to provide signals via high speed data link 82 to control 80. For example as noted above, 14,400 hertz may be a typical frequency of position data transmission, and for the typical geometries involved, the mechanism can faithfully follow inputs at this rate.

A turning machine embodying principles of the invention exhibits a performance which enables the cutting tool to follow, with quickness and accuracy, changes which are correlated with the rapidly rotating part being turned. Depending upon the actual profile of a part, any given updating from the CNC may or may not contain a change in position information. For example, in the case where a circular shape is to be created in conjunction with an axial taper, the radial position of the cutting tool would change at most only once per revolution of the piston, and therefore the updating of the demand position would actually change at most only once per revolution of the part.

The versatility of the invention should be readily apparent. I order to change the machine to turn a different piston shape, all that is necessary is to load the CNC with a new program relating to the new piston geometry. The CNC will act upon the program in conjunction with the feedback signal from encoder 54 to provide appropriate command signals for the radial positioning of the cutting tool. The closed loop control as disclosed with reference to FIGS. 12A, 12B, and 12C comprises means for enabling the tool to faithfully follow the commands.

It will also be observed that the mechanical construction of the turning machine has the advantage of being relatively compact, yet possessing strength to conduct the turning operations in conjunction with the ability to respond quickly to even small changes.

Based upon the foregoing description, it will be appreciated that details of the turning machine construction can be specified in accordance with conventional engineering design and fabrication procedures. For example the characteristics of the leaf spring mechanism are chosen to provide for the forceful constraint of the bar in the assembled condition of the machine as illustrated with reference to FIGS. 8, 9, and 10. The amount of force which is exerted is sufficient to prevent undesired deflections at all times, even tool chatter when the tool is operating on a workpiece in the usual manner. The extent of the yieldable forceful constraint is however insufficient to detract in any significant way from the ability of the carriage to roll fully on the sets of rollers. Although the engagement of the rollers with the bar is described as being yieldably forceful, the typical usage of the turning machine under the intended operating conditions does not result in yielding of the rollers.

It is also to be observed that the action of the rollers on the carriage is symmetrical so that no undesired bending loads are created in the carriage by virtue of the yieldably forceful action of the rollers upon it. By utilizing a bar of rectangular cross section for the carriage and two sets of orthogonally related (90° apart) rollers acting upon the opposite parallel surfaces of the bar, the bar is accurately guided for straight line motion. With the adjustment feature provided for each of the two orthogonally related sets of rollers as described above, the line of travel can be accurately set in both a vertical plane as well as a horizontal one.

It should also be observed that the rollers alone serve to guide and constrain the moving parts. In other words there is no guide means which is directly active on the armature of the linear motor.

The invention comprises a significant development in turning apparatus, and while a preferred embodiment has been disclosed, it will be appreciated that principles are applicable to other embodiments.

What is claimed is:

1. In a turning machine (40) comprising means for rotating (48) a part (42) about an axis (44) and for causing a cutting tool (56) to make an axial pass along the part while the radial position of the tool relative to the part is selectively controlled in correlation with the angular position of the part about the axis of rotation as the part is being rotated, the improvement which comprises a main CNC control (58), angular position sensing means (54) operatively coupled with said means for rotating the part to provide to the CNC control information representative of instantaneous angular position of the part about the axis for rotation as the part is being rotated, radial position sensing means (74) for sensing the radial position of the cutting tool relative to the part, radial velocity sensing means (76) for sensing the radial velocity of the tool relative to the part, and a closed loop control system (80) for closed loop controlling the radial position of the cutting tool relative to the part as a function of the radial position of the cutting tool and the radial velocity of the cutting tool, said closed loop control system comprising an electric linear motor (72) as the prime mover for radially positioning the cutting tool, said CNC comprising means for issuing commands to the closed loop control system correlated with the information with said position sensing means and information about the part, and said closed loop control system comprising means for converting the CNC commands into a corresponding control current for the linear motor *wherein one end of an elongated carriage is adapted to be coupled to the cutting tool, the other end of the carriage being coupled to the motor for transmitting linear motion and wherein said linear motor and carriage are mounted on the head of the machine, and in which said carriage is guided for reciprocable linear motion on the machine head by guide means (138,178) disposed in cooperative relation with the carriage and the machine head for facilitating sliding movement of the carriage, and spring means (148) for spring-loading the guide means with a spring force sufficient to resist displacement in any direction transverse to the radial direction and thereby minimize deflection of the carriage in any such direction.*

2. The improvement set forth in claim 1 in which said linear motor comprises a linearly moveable armature containing a coil disposed within a magnetic field and said control current being [oonducted] *conducted* through said coil to control the linear positioning of said armature.

3. The improvement set forth in claim 2 in which the magnetic field within which said coil is disposed comprises means, including a circular annular magnet, defining an annular free space within which flux issued by the magnet is contained, and said coil is concentrically disposed within said free space.

4. The improvement set forth in claim [3] *2* in which said armature is in the form of a bobbin which in turn is operatively connected to [a] *the* carriage [on which the cutting tool is mounted].

[5. The improvement set forth in claim 4 in which said linear motor and carriage are mounted on a head of the machine, and in which said carriage is guided for the linear motion on the machine head by means of guide means, said bobbin being free of contact with said guide means.]

6. The improvement set forth in claim [5] *1* in which said guide means comprises plural rollers acting upon said carriage.

7. The improvement set forth in claim 6 in which said carriage comprises a hollow bar having an exterior surface which in transverse cross section is polygonal, and in which there are plural sets of rollers having rolling contact with the exterior surface of said hollow bar.

8. The improvement set forth in claim 7 in which at least one set of rollers comprises plural non-yieldably mounted rollers and plural yieldably mounted rollers, such yieldably and non-yieldably mounted rollers co-acting on respective exterior surface portions of said hollow bar to provide for yieldably forceful constraint of said hollow bar by such rollers while still allowing the carriage to be rolled on said rollers.

9. The improvement set forth in claim 8 in which said bar's exterior cross sectional shape is rectangular and there are two sets of rollers, orthogonally related, each set co-acting on respective opposite exterior surface portions of said bar, and in which the non-yieldably mounted rollers of each set comprise a forward pair and a rearward pair having rolling contact with said bar at spaced apart points and the yieldably mounted rollers of each set comprise a forward pair and a rearward pair having rolling contact with said bar at substantially the same forward and rearward locations as for the coacting non-yieldably mounted ones, the yieldably mounted roller pairs each being mounted on the machine head by means of a corresponding leaf spring mechanism, and further including means for selectively positioning at least one pair of each set's non-yieldably mounted rollers toward and away from the axis of the hollow bar.

[10. The improvement set forth in claim 1 in which the linear motor is mounted on a head of the turning machine and is operatively connected to a carriage on which the cutting tool is mounted, and said closed loop control system including plural sensors on the machine's head operated by movement imparted to said carriage by said linear motor, said sensors providing respective signals for use by the closed loop control system.]

[11. The improvement set forth in claim 10 in which one of said plural sensors provides a velocity signal representative of instantaneous velocity of said carriage and another of said plural sensors provides a position signal of instantaneous position of said carriage.]

[12. The improvement set forth in claim 11 in which said one sensor comprises a sensing coil concentric with said linear motor and disposed within a bore passing through the interior of the linear motor, said one sensor further including a core concentrically disposed with respect to said sensing coil and moveable through the sensing coil with the operation of the carriage by the linear motor so that the sensing coil provides a signal indicative of the instantaneous velocity of the carriage.]

13. [The improvement set forth in claim 11 in which said another sensor comprises] *In a turning machine (40) comprising means for rotating (48) a part (42) about an axis (44) and for causing a cutting tool (56) to make an axial pass along the part while the radial position of the tool relative to the part is selectively controlled in correlation with the angular position of the part about the axis of rotation as the part is being rotated, the improvement which comprises a main CNC control (58), angular position sensing means (54) operatively coupled with said means for rotating the part to provide to the CNC control information representative of instantaneous angular position of the part about the axis for rotation as the part is being rotated, radial position sensing means (74) for sensing the radial position of the cutting tool relative to the part, radial velocity sensing means (76) for sensing the radial velocity of the tool relative to the part, and a closed loop control system (80) for closed loop controlling the radial position of the cutting tool relative to the part as a function of the radial position of the cutting tool and the radial velocity of the cutting tool, said closed loop control system comprising an electric linear motor (72) as the prime mover for radially positioning the cutting tool, said CNC comprising means for issuing commands to the closed loop control system correlated with the information with said position sensing means and information about the part, and said closed loop control system comprising means for converting the CNC commands into a corresponding control current for the linear motor in which the linear motor is mounted on a head of the turning machine and is operatively connected to a carriage on which the cutting tool is mounted, and said closed loop control system including at least one sensor on the machine's head operated by movement imparted to said carriage by said linear motor, said at least one sensor providing a signal for use by the closed loop control system, the at least one sensor comprising* a fixed reference scale (*220*) *in the form of a grating* mounted on the carriage for movement therewith and a sensing head (*222*) mounted on the machine's head *laterally* adjacent the line of travel of the scale, the motion of the scale past said sensing head causing said sensing head to provide the position signal correlating the position of the scale, and hence the carriage, on the machine's head.

14. The improvement set forth in claim 13 in which *the closed loop control system includes plural sensors,* a further of said plural sensors senses when said scale is in juxtaposition to said sensing head to thereby define a range over which said sensing head is confined to provide said position feedback signal.

15. [The improvement set forth in claim 1] *In a turning machine (40) comprising means for rotating (48) a part (42) about an axis (44) and for causing a cutting tool (56) to make an axial pass along the part while the radial position of the tool relative to the part is selectively controlled in correlation with the angular position of the part about the axis of rotation as the part is being rotated, the improvement which comprises a main CNC control (58), angular position sensing means (54) operatively coupled with said means for rotating the part to provide to the CNC control information representative of instantaneous angular position of the part about the axis for rotation as the part is being rotated, radial position sensing means (74) for sensing the radial position of the cutting tool relative to the part, radial velocity sensing means (76) for sensing the radial velocity of the tool relative to the part, and a closed loop control system (80) for closed loop controlling the radial position of the cutting tool relative to the part as a function of the radial position of the cutting tool and the radial velocity of the cutting tool, said closed loop control system comprising an electric linear motor (72) as the prime mover for radially positioning the cutting tool, said CNC comprising means for issuing commands to the closed loop control system correlated with the information with said position sensing means and information about the part, and said closed loop control system comprising means for converting the CNC commands into a corresponding control current for the linear motor,* in which the linear motor is mounted on a head of the turning machine and is operatively connected to a carriage on which the cutting tool is mounted, and said closed loop control system comprising a position control loop which exercises principal control over said linear motor in positioning said carriage and also a velocity control loop in which velocity feedback information supplements the principal control provided by the position loop control *in which the machine comprises means for causing said closed loop control system to operate selectively in a position control mode in which the position and the velocity control loops are both active and in a velocity control mode in which only the velocity feedback loop, and not the position feedback loop, is active.*

[16. The improvement set forth in claim 15 in which the machine comprises means for causing said closed loop control system to operate selectively in a position control mode in which the position and the velocity control loops are both active and in a velocity control mode in which only the velocity feedback loop, and not the position feedback loop, is active.]

17. The improvement set forth in claim [16] *15* in which the machine comprises means for executing the velocity control mode of operation at the beginning of an operating sequence on a part until the carriage has been advanced from a home position to a position where the cutting tool is just off the part, and thereafter executing the position control mode of operation to conduct turning operations on the part.

18. The improvement set forth in claim 17 in which said closed loop control system comprises a register which is set to a zero reference when operation switches from the velocity control mode to the position control mode, and including a switch in the position control loop forward of the velocity control loop which is operated concurrent with the setting of said register to the zero reference to thereby render the position loop active.

19. [The improvement set forth in claim 1] *In a turning machine (40) comprising means for rotating (48) a part (42) about an axis (44) and for causing a cutting tool (56) to make an axial pass along the part while the radial position of the tool relative to the part is selectively controlled in correlation with the angular position of the part about the axis of rotation as the part is being rotated, the improvement which comprises a main CNC control (58), angular position sensing means (54) operatively coupled with said means for rotating the part to provide to the CNC control information representative of instantaneous angular position of the part about the axis for rotation as the part is being rotated, radial position sensing means (74) for sensing the radial position of the cutting tool relative to the part, radial velocity sensing means (76) for sensing the radial velocity of the tool relative to the part, and a closed loop control system (80) for closed loop controlling the radial position of the cutting tool relative to the part as a function of the radial position of the cutting tool and the radial velocity of the cutting tool, said closed loop control system comprising an electric linear motor (72) as the prime mover for radially positioning the cutting tool, said CNC comprising means for issuing commands to the closed loop control system correlated with the information with said position sensing means and information about the part, and said closed loop control system comprising means for converting the CNC commands into a corresponding control current for the linear motor,* in which said closed loop control system comprises position feedback with means to absolutely relate position feedback to the cutting tool position *which said closed loop control system further comprises velocity feedback coactive with the position feedback in which said closed loop control system comprises means for applying the transfer function*

$$K_v/sT+1$$

*to the velocity feedback to modify same, and the transfer function*

$$K_p/sT+1$$

*to the position feedback to modify same, and means for summing the two modified feedback signals and subtracting the sum from a demand position amplified $K_i x_i$ at a position summing junction to create a position error signal for the principal control of the tool position wherein T is chosen to satisfy the relationship*

$$T=K_v/K_p$$

*wherein $x_i$ is the demand position, $K_i$ is gain applied to the demand position, $K_p$ is the gain of the position feedback, $K_v$ is the gain of the velocity feedback, and s is the Laplace operator symbol.*

[20. The improvement set forth in claim 19 in which said closed loop control system further comprises velocity feedback coactive with the position feedback.]

[21. The improvement set forth in claim 20 in which said closed loop control system comprises means for applying the transfer function $K_v/sT+1$ to the velocity feedback to modify same, and the transfer function $K_p/sT+1$ to the position feedback to modify same, and means for summing the two modified feedback signals and subtracting the sum from a demand position amplified $K_i x_i$ at a position summing junction to create a position error signal for the principal control of the tool position wherein T is chosen to satisfy the relationship $T = K_v/K_p$ wherein $x_i$ is the demand position, $K_i$ is gain applied to the demand position, $K_p$ is the gain of the position feedback, $K_v$ is the gain of the velocity feedback, and s is the Laplace operator symbol.]

22. The improvement set forth in claim [21] *19* further including a feed-forward branch forward of said position summing junction, said feed-forward branch comprising means for providing compensation to the demand position to anticipate the size of future change in demand postion.

23. The improvement set forth in claim 22 in which said closed loop control system comprises means to modify the velocity feedback by gain $K_{v2}$ and to apply the last-mentioned modified velocity feedback to a further summing junction at which the position error signal and the last-mentioned modified velocity feedback are processed to created a modified postion error signal which is used to control the linear motor, and wherein the following relationships exist:

$$x_i K_i - x_0 K_{p0} + s x_i K_2 - s K_{v2} x_0 = 0,$$

$$\frac{K_2}{K_i} = \frac{K_{v2}}{K_{p0}},$$

$$K_{p0} = \frac{K_p(1 + sK_v/K_p)}{sT + 1}$$

wherein the velocity feedback signal is $sx_0$.

24. [The improvement set forth in claim 19] *In a turning machine (40) comprising means for rotating (48) a part (42) about an axis (44) and for causing a cutting tool (56) to make an axial pass along the part while the radial position of the tool relative to the part is selectively controlled in correlation with the angular position of the part about the axis of rotation as the part is being rotated, the improvement which comprises a main CNC control (58), angular position sensing means (54) operatively coupled with said means for rotating the part to provide to the CNC control information representative of instantaneous angular position of the part about the axis for rotation as the part is being rotated, radial position sensing means (74) for sensing the radial position of the cutting tool relative to the part, radial velocity sensing means (76) for sensing the radial velocity of the tool relative to the part, and a closed loop control system (80) for closed loop controlling the radial position of the cutting tool relative to the part as a function of the radial position of the cutting tool and the radial velocity of the cutting tool, said closed loop control system comprising an electric linear motor (72) as the prime mover for radially positioning the cutting tool, said CNC comprising means for issuing commands to the closed loop control system correlated with the information with said position sensing means and information about the part, and said closed loop control system comprising means for converting the CNC commands into a corresponding control current for the linear motor in which said closed loop control system comprises position feedback with means to absolutely relate position feedback to the cutting tool position,* in which the position feedback is provided by a fixed reference scale moveable with the tool and a sensing head past which the scale moves when the tool is operated by the linear motor, the motion of the scale past the sensing head causing the sensing head to provide said position feedback, said closed loop control system further comprising an on-scale sensor for confirming when said scale is in juxtaposition to said sensing head to thereby define a range over which said sensing head is confirmed to provide said position feedback and further including a home sensor for sensing a home position of the cutting tool, said machine comprising means for causing said closed loop control system to operate selectively in a position control mode in which said position feedback as confirmed by said on-scale sensor provides position feedback acted upon by the closed loop control system to exercise principal control over the operation of the linear motor and in a velocity control mode in which the velocity feedback alone is acted upon by the closed loop control system to exercise control over operation of the linear motor, and means for causing the velocity control mode of operation to occur between the home position defined by the home sensor and a position defined by a zero reference set in the control relative to an absolute reference set by the position feedback.

25. In a turning machine comprising means for rotating a part about an axis and for causing a cutting tool to make an axial pass along the part while the radial position of the tool relative to the part is selectively controlled in correlation with the angular position of the part about the axis of rotation as the part is being rotated, the improvement which comprises a main CNC control, position sensing means operatively coupled with said means for rotating the part to provide to the CNC control information representative of instantaneous angular position of the part about the axis of rotation as the part is being rotated, radial position sensing means for sensing the radial position of the cutting tool relative to the part, radial velocity sensing means for sensing the radial velocity of the tool relative to the part, and a closed loop control system for closed loop controlling the radial position of the cutting tool relative to the part as a function of the radial position of the cutting tool and the radial velocity of the cutting tool, said closed loop control system comprising an electric linear motor for radially positioning the cutting tool, said CNC comprising means for issuing commands to the closed loop control system correlated with information from said position sensing means and information about the part, and said closed loop control system comprising means for converting the CNC commands into a corresponding control signal for the linear motor and wherein said tool is mounted on a carriage which is guided by guide means on a head with the carriage being operatively coupled with the linear motor so as to be selectively positionable along a line of travel on the head in accordance with operation of the linear motor by the control signal developed from the CNC commands, said carriage comprising a hollow bar having an exterior surface which in transverse cross section is polygonal and in which said guide means comprises a plural sets of rollers providing rolling contact with the exterior surface of said hollow bar as said hollow bar is operated by said linear motor and in which at least one set of rollers comprises plural non-yieldably mounted rollers and plural yieldably mounted rollers, such yieldably and non-yieldably mounted rollers coacting with respective exterior surface portions of said hollow bar to provide for [yieldablr] *yieldably* forceful constraint of the hollow bar while allowing the bar to be rolled thereon.

26. The improvement set forth in claim 25 in which said bar's exterior cross sectional shape is rectangular and there are two sets of rollers, orthogonally related, each set coacting on respective opposite exterior surface portions of said bar and in which the non-yieldably mounted rollers of each set comprise a forward pair and a rearward pair having rolling contact with said bar at space point parts and the yieldably mounted rollers of each set comprise a forward pair and a rearward pair having rolling contact with said bar at substantially the same forward and rearward locations as for the coacting non-yieldably mounted ones.

27. The improvement set forth in claim 26 in which the yieldably mounted roller pairs of each set are mounted on the head by means of a corresponding leaf spring mechanism and further including means for selectively positioning at least one pair of each set's non-yieldably mounted rollers toward and away from the axis of the hollow bar.

28. The improvement set forth in claim 26 in which the rollers are disposed on axles and the rollers roll on margins of said exterior surface portions immediately adjacent edges at which said exterior surface portions meet.

29. The improvement set forth in claim 25 in which said linear motor comprises a linearly moveable armature coaxial with the axis of the hollow bar and attached to the hollow bar.

30. The improvement set forth in claim 29 in which said armature comprises a tubular bobbin having a circular annular transverse cross sectional shape and a cap via which the bobbin attaches at an axial end thereof to the hollow bar, and stops on the head disposed for abutment by the cap to define limits of travel for the carriage and bobbin on the head.

31. The improvement set forth in claim 29 in which said armature comprises a tubular bobbin having an open axial end, said open axial end being disposed within a circular annular free space containing a magnetic field, said bobbin comprising a coil thereon disposed within the magnetic field of said free space, said coil receiving a control current constituting the control signal for the prime mover with the interaction between the magnetic field of said free space and the control current in said coil operates the prime mover, and hence the carriage.

32. The improvement set forth in claim 25 including plural sensors on said head providing position and velocity information derived from operation of the carriage by the linear motor for [used] *use* by the closed loop control.

33. The improvement set forth in claim 32 in which one of said sensors is a velocity sensor comprising a coil mounted on the head and a core which is moveable with the carriage so as to be selectively positionable with respect to said coil by operation of said linear motor to thereby cause a signal to be created in said coil representative of instantaneous velocity of said carriage and another of said sensors is a position sensor disposed on the head laterally adjacent the carriage, said position sensor comprising a sensing head mounted on the machine's head and a scale attached to the carriage with the scale disposed for travel with the carriage along a line of travel past the sensing head for causing the sensing head to provide signals containing the position information.

34. In a turning machine having a head on which a tool is selectively positionable toward and away from a workpiece by a prime mover and a carriage, an improved prime mover and carriage combination for selectively positioning the tool on the head characterized by low friction, low inertia, and rapid response to input commands and comprising an electric linear motor forming the prime mover and a bar forming the carriage, said bar having plural exterior surface portions via which the bar rolls on coacting sets of rollers on the head, said coacting sets of rollers being arranged to constrain [to] *the* bar to motion along a line of travel toward and away from the part while applying yieldably forceful engagement of the bar, and wherein the bar is further defined to have a rectangular exterior cross sectional shape so that said plural exterior surface portions comprise two pairs of parallel surfaces with the two pairs being 90° apart about the axis of the bar, and in which for each pair of parallel surfaces there is a corresponding coacting set of rollers, each coacting set comprising a set of plural non-yieldably mounted rollers and a set of plural yieldably mounted rollers.

35. The improved prime mover and carriage combination set forth in claim 34 in which each set of yieldably mounted rollers is yieldably mounted on the head by a leaf spring mechanism.

36. The improved prime mover and carriage combination set forth in claim 35 in which each set of non-yieldably mounted rollers includes means for selectively positioning at least some of its rollers toward and away from the axis of the bar.

37. The improved prime mover and carriage combination set forth in claim 36 in which said means for selectively positioning at least some of the rollers of each non-yieldably mounted set toward and away from the axis of the hollow bar comprises a yoke containing such rollers and an adjustment screw mechanism engaging said yoke, said adjustment screw mechanism having a threaded engagement with the head to provide for the selective positioning of the yoke by rotating the adjustment screw mechanism and means for locking the adjustment screw mechanism against further rotation once the desired yoke positioning has been attained.

38. The improved prime mover and carriage combination set forth in claim 37 in which said yoke comprises a hole, said adjustment screw mechanism having a distal end extending into and engaging the bottom of said hole.

39. The improved prime mover and carriage combination set forth in claim 35 in which each set of yieldably mounted rollers comprises a forward pair and a rearward pair mounted on their respective yokes, each leaf spring mechanism having opposite ends which attach respectively to the corresponding two yokes, and means for attaching each leaf spring mechanism centrally thereof to the head.

40. The improved prime mover and carriage combination set forth in claim 39 in which each set of non-yieldably mounted rollers comprises a rearward pair and at least one forward pair, each such last-mentioned forward pair and rearward pair being disposed on respective yokes one of which is fixedly secured on the head and the other of which is selectively positionable toward and away from the axis of the hollow bar and when selectively positioned to a desired position is locked against any further displacement.

41. The improved prime mover and carriage combination set forth in claim 34 in which said bar is hollow throughout its entire length, said tool being mounted at the forward end of said bar, and a cap at the rearward end of said bar via which the bar attaches to the linear motor, said linear motor being arranged coaxially with said bar.

42. The improved prime mover and carriage combination set forth in claim 41 including stops on the head disposed for abutment by the cap to define limits of travel for the carriage on the head.

43. The improved prime mover and carriage combination set forth in claim 41 in which said prime mover comprises an armature in the form of a tubular bobbin which attaches at one axial end thereof to said cap and with the opposite axial end thereof being open, said open axial end being disposed within a circular annular free space containing a magnetic field, and said bobbin comprising a coil thereon disposed within the magnetic field of said free space, said coil being adapted for receiving control current for interaction with the magnetic field of said free space to operate said bar along its line of travel.

44. The improved prime mover and carriage combination set forth in claim 43 in which the magnetic field of said free space is provided by a tubular magnetic having a circular annular cross sectional shape disposed concentrically around said free space.

[45. A method of controlling the radial position of a tool relative to the rotational axis of a workpiece in a turning cperation whrein the surface geometry of the workpiece is defined by a data matrix of axial, angular and radial position coordinates, said method comprising the steps of:

generating an anular position signal representative of the current angular position of the workpiece and an axial position signal representative of the current aaxial position of the tool relative to the workpiece;

correlating the angular and axial position signals with the data matrix to generate a demand control signal as a function of the angular and axial position signals;

generating an actual radial position signal representative of the current radial position of the tool and a radial velocity signal representative of the current radial velocity of the tool;

generating a tool feedback signal having a velocity component derived from the radial velocity signal and a position component derived from the actual radial position signal; and comparing the demand control signal to the tool feedback signal to produce a tool adjustment signal for controlling the radial position of the tool as both a function tool position and velocity.]

[46. The method of claim 45 wherein the demand control signal has a first component based on the prior demanded radial position value from the data matrix, and a second component based on the difference of the current demanded radial position value and the prior demanded radial position value.]

[47. The method of claim 46 wherein the second component is a feed forward signal which is a function of the difference in said values.]

[48. The method of claim 46 wherein the demand control signal is obtained by summing the first component and the second component.]

[49. The method of claim 46 wherein the first component is modified by integrating the second component and summing the integral of the second component with the first component.]

[50. The method of claim 45 wherein the tool feedback signal is obtained by summing the velocity component and the position component.]

[51. The method of claim 45 comprising the further step of modifying the tool adjustment signal by negative feedback of the radial velocity signal.]

[52. A system for controlling the radial position of a tool relative to the rotational axis of a workpiece whrein the surface geometry of the workpiece is defined by a data matrix of axial, angular and radial position coordinates, the system comprising:

angular position sensor means (54) for producing an angular position signal representative of the current angular position of the workpiece (42);

axial position sensor means (66) for producing an axial position signal representative of the current axial position of the tool (56) relative to the workpiece;

CNC means (58) for correlating the angular and axial position signals to the data matrix to produce a demanded radial position signal corresponding to the angular and axial position signals;

an electric linear motor coupled to the tool for radial movement of the tool in accordance with a tool control signal;

radial velocity sensor means (76) for producing a velocity signal representative of the radial velocity of the tool;

radial position sensor means (74) for producing an actual radial position signal representative of the current radial position of the tool; and control means (80) for, producing a tool feedback signal having a velocity component derived from the radial velocity signal and a position component derived from the actual radial position signal, producing a demand control signal derived from the demanded radial position signal, and comparing the demand control signal and the tool feedback signal to produce the tool control signal for controlling the radial position of the tool as a function of both tool position and velocity.]

[53. The system of claim 52 wherein the second control means includes demand signal processing means for producing a demand control signal having a first component (404) based on the prior demanded radial position signal, and a second component (412) based on the difference of the current demanded radial position signal and the prior demanded radial position signal.]

[54. The system of claim 53 wherein the demand signal processing means further includes means (420) for operating on the difference signal to produce a feed forward signal which is a function of the difference signal.]

[55. The system of claim 53 wherein the demand signal processing means further includes means for summing (422) the first component and the second component to obtain the demand control signal.]

[56. The system of claim 53 wherein the demand signal processing means includes means for integrating (418) the second component and summing (408) the integral of the second component with the first component to modify the first component.]

[57. The system of claim 52 wherein the control means includes tool signal processing means for summing (460) the velocity component and the position component to obtain the tool feedback signal.]

[58. The system of claim 52 wherein the control means further comprises means for modifying the tool adjustment signal by negative feedback (466) of the radial velocity signal.]

[59. In combination with a machine tool (40) of the type having a spindle (48) for rotating a workpiece (42) to be machined, a cutting head (56), an electric linear motor (72) for moving the cutting head (56) radially relative to the spindle axis (44), control means for producing an output signal for controlling the linear motor to machine the workpiece to have a configuration that is defined by a stored part program, said control means including means (54) for sensing the angular position of said spindle, means (66) for sensing the axial position of said cutting head and means (74) for sensing the radial position of said cutting head, the improvement characterized in that:

said control means includes means (76) for sensing the radial velocity of said cutting head (56) and produces said output signal for controlling said linear motor in response to said angular position sensing means, said axial position sensing means, said radial position sensing means and said radial velocity sensing means.]

[60. The machine tool of claim 59 wherein the closed loop control system performs the step of comparing a demand control signal which is a function for the programmed position of the cutting head to a feedback signal which is a function of at least the radial position of the cutting head.]

[61. The machine tool of claim 60 wherein the output signal for controlling the linear motor is a function of the compared signals and the radial velocity of the cutting head.]

[62. The machine tool of claim 60 wherein the feedback signal is also a function of the radial velocity of the cutting head.]

[63. The machine tool of claim 62 wherein the closed loop control system develops the feedback signal by a summation (422) of signals based on the radial position and the radial velocity of the cutting head.]

[64. The machine tool of claim 59 further comprising CNC means (58), cooperative with the closed loop control system, for generating a prgrammed radial position signal based on a correlation of the angular position of the spindle and the axial position of the cutting head, for use in deriving the demand control signal.]

[65. The machine tool of claim 63 wherein the closed loop control system further includes feed forward signal processing means for producing a demand control signal which is a function of the present programmed radial position signal and the next successive programmed radial position signal.]

[66. An improved machine tool (40) of the type having a spindle (48) for rotating a workpiece (42) to be machined, a cutting head (56), an electric linear motor (72) for moving the cutting head radially relative to the spindle axis (44) to machine the workpiece to have configuration that is defined by a stored part program, said linear motor being controlled by closed loop control system (80) responsive to the radial position of the cutting head as derived from radial position sensing means (74) and the radial velocity of the cutting head as derived from radial velocity sending means (76), the improvement characterized in that:

the closed loop control system provides an output signal for controlling the linear motor which is a function of the present and the next successive programmed positions of the cutting head.]

[67. The machine tool of claim 66 wherein the closed loop control system develops a feed forward signal which is a function of the difference of the present and the next successive programmed positions of the cutting head.]

[68. The machine tool of claim 67 wherein the feed forward signal is combined with a signal representative of the present programmed position to develop a demand control signal.]

[69. The machine tool of claim 68 wherein the output signal for controlling the linear motor is a function of the demand control signal, the radial position of the cutting head and the radial velocity of the cutting head.]

[70. In combination with a machine tool (40) of the type including a spindle (48) for rotating a workpiece (42) to be machined about a spindle axis (44), a cutting head (56), an electric linear motor (72) responsive to a control signal for moving the cutting head (56) radially relative to said spindle axis (44), and control means (80, 58, 54, 66, 74) for providing a control signal to the electric linear motor to machine the workpiece to have a configuration defined by a stored part program, said control means including angular position sensing means (54) for sensing the angular position of the workpiece (42) about the spindle axis (44), axial position sensing means (66) for sensing the axial position of the cutting head (56) along the spindle axis (44), and radial position sensing means (74) for sensing the radial position of said cutting head (56) relative to said spindle axis (44) to develop the control signal as a function of the sensed angular, axial and radial positions, the improvement characterized in that:

the control means further comprises radial velocity sensing means (76) to sense the radial velocity of the cutting head (56) relative to said spindle axis (44) to develop an improved control signal as a function of the sensed angular, axial and radial positions and the sensed radial velocity.]

[71. The invention of claim 70 wherein the control means develops the control signal from a comparison of a demand control signal derived from the sensed angular and axial positions to a feedback signal derived from the sensed radial position and the sensed radial velocity.]

[72. The invention of claim 71 wherein the control means includes CNC means (58) for correlating the sensed angular and axial positions to a programmed position which is functionally related to the demand control signal.]

[73. The invention of claim 71 wherein the control means derives the feedback signal from a summation (422) of signals based on the sensed radial position and the sensed radial velocity.]

[74. The invention of claim 71 wherein the control means further includes feed forward signal processing means for producing a demand control signal which is a function of the present programmed position and the next successive programmed position.]

*75. In a turning machine having a head on which a tool is selectively positionable toward and away from a workpiece by a prime mover and a carriage, an improved prime mover and carriage combination for selectively positioning the tool on the head characterized by low friction, low inertia, and rapid response to input commands and comprising an electric linear motor forming the prime mover wherein one end of the carriage is adapted to be coupled to the cutting tool, the other end of the carriage is coupled to the motor for transmitting linear motion and wherein said linear motor and carriage are mounted on the head of the machine, and in which said carriage is guided for reciprocable linear motion on the machine head by guide means (138,178) disposed in cooperative relation with the carriage and the machine head for facilitating sliding movement of the carriage, and spring means (148) for spring-loading the guide means with a spring force sufficient to resist displacement in any direction transverse to the radial direction and thereby minimize deflection of the carriage in any such direction.*

*76. The combination of claim 75 further comprising means (166,182,184) for precisely locating the tool carriage relative to the tool head at a predetermined reference position.*

*77. The combination of claim 75 wherein the carriage (128) is hollow.*

*78. The combination of claim 75 or claim 77 wherein the carriage (128) has an exterior surface which in transverse cross section is polygonal.*

*79. The combination of claim 75 wherein the guide means includes plural sets of rollers.*

*80. The combination of claim 79 wherein at least one set of rollers includes plural non-yieldably mounted rollers and plural yieldably mounted rollers coacting on respective portions of the carriage (128).*

*81. The combination of claim 80 wherein the yieldably mounted rollers are pre-loaded by said spring means.*

*82. In a turning machine having a head on which a tool is selectively positionable toward and away from a workpiece by a prime mover and a carriage an improved prime mover and carriage combination for selectively positioning the tool on the head characterized by low friction, low inertia, and rapid response to input commands and comprising an electric linear motor forming the prime mover wherein one end of the carriage is adapted to be coupled to the cutting tool, the other end of the carriage is coupled to the motor for transmitting linear motion and wherein said linear motor and carriage are mounted on the head of the machine; and a fixed reference scale (220) in the form of a grating mounted on the carriage for movement therewith and a sensing head (222) mounted on the machine head laterally adjacent the line of travel of the scale (220), the motion of the scale (220) past said sensing head (222) causing said sensing head (222) to provide a position signal correlating the position of the scale (220), and hence the carriage on the machine head.*

* * * * *